(12) United States Patent
Bartley et al.

(10) Patent No.: US 7,818,512 B2
(45) Date of Patent: Oct. 19, 2010

(54) HIGH CAPACITY MEMORY SUBSYSTEM ARCHITECTURE EMPLOYING HIERARCHICAL TREE CONFIGURATION OF MEMORY MODULES

(75) Inventors: Gerald Keith Bartley, Rochester, MN (US); John Michael Borkenhagen, Rochester, MN (US); Philip Raymond Germann, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 11/768,988

(22) Filed: Jun. 27, 2007

(65) Prior Publication Data

US 2009/0006752 A1  Jan. 1, 2009

(51) Int. Cl.
*G06F 12/00* (2006.01)
(52) U.S. Cl. ............. 711/148; 711/122; 711/E12.001
(58) Field of Classification Search .............. 711/117, 711/122, 148
See application file for complete search history.

(56) References Cited

U.S. PATENT DOCUMENTS

| | | | |
|---|---|---|---|
| 5,893,927 A | 4/1999 | Hovis | |
| 6,502,161 B1 | 12/2002 | Perego et al. | |
| 7,120,723 B2 | 10/2006 | Jeddeloh | |
| 7,120,727 B2 | 10/2006 | Lee et al. | |
| 7,136,958 B2 | 11/2006 | Jeddeloh | |
| 7,188,219 B2 | 3/2007 | Jeddeloh | |
| 7,378,868 B2 | 5/2008 | Tyhach et al. | |
| 7,397,684 B2 | 7/2008 | Ruckerbauer et al. | |
| 7,411,843 B2 | 8/2008 | Ruckerbauer et al. | |
| 7,477,717 B2 | 1/2009 | Kuzmenka et al. | |
| 2002/0023191 A1 | 2/2002 | Fudeyasu | |
| 2002/0084458 A1 | 7/2002 | Halbert et al. | |
| 2004/0243769 A1 | 12/2004 | Frame et al. | |
| 2004/0256638 A1 | 12/2004 | Perego et al. | |
| 2005/0144403 A1 | 6/2005 | Jeddeloh | |
| 2005/0210216 A1 | 9/2005 | Jobs et al. | |
| 2006/0245226 A1 | 11/2006 | Stewart | |
| 2006/0265533 A1* | 11/2006 | Hobson et al. ............... 710/120 |
| 2007/0079057 A1 | 4/2007 | Ruckerbauer et al. | |
| 2007/0124532 A1 | 5/2007 | Bennett | |
| 2008/0077732 A1 | 3/2008 | Risse | |
| 2008/0250270 A1 | 10/2008 | Bennett | |

FOREIGN PATENT DOCUMENTS

EP  1628225 A2  2/2006

OTHER PUBLICATIONS

U.S. Appl. No. 11/459,956, filed Jul. 26, 2006, "Daisy Chained Memory System".

(Continued)

*Primary Examiner*—Mardochee Chery
(74) *Attorney, Agent, or Firm*—Roy W. Truelson

(57) ABSTRACT

A high-capacity memory subsystem architecture utilizes multiple memory modules arranged in a hierarchical tree configuration, in which at least some communications from an external source traverse successive levels of the tree to reach memory modules at the lowest level. Preferably, the memory system employs buffered memory chips having dual-mode operation, one of which supports a tree configuration in which data is interleaved and the communications buses operate at reduced bus width and/or reduced bus frequency to match the level of interleaving.

18 Claims, 9 Drawing Sheets

OTHER PUBLICATIONS

U.S. Appl. No. 11/459,957, filed Jul. 26, 2006, Memory System Having Self Timed Daisy Chained Memory Chips.
U.S. Appl. No. 11/459,969, filed Jul. 26, 2006, "Carrier Having Daisy Chained Memory Chips".
U.S. Appl. No. 11/459,983, filed Jul. 26, 2006, "Carrier Having Daisy Chain of Self Timed Memory Chips".
U.S. Appl. No. 11/459,994, filed Jul. 26, 2006, "Daisy Chainable Memory Chip".
U.S. Appl. No. 11/459,997, filed Jul. 26, 2006, "Daisy Chainable Self Timed Memory Chip".
U.S. Appl. No. 11/459,974, filed Jul. 26, 2006, "Computer System Having Daisy Chained Memory Chips".
U.S. Appl. No. 11/459,968, filed Jul. 26, 2006, Computer System Having Daisy Chained Self Timed Memory Chips.
U.S. Appl. No. 11/459,966, filed Jul. 26, 2006, "Memory Controller for Daisy Chained Memory Chips".
U.S. Appl. No. 11/459,961, filed Jul. 26, 2006, "Memory controller for Daisy Chained Self Timed Memory Chips".
U.S. Appl. No. 11/459,943, filed Jul. 26, 2006, "Memory Chip Having an Apportionable Data Bus".
U.S. Appl. No. 11/459,947, filed Jul. 26, 2006, "Self Timed Memory Chip Having an Apportionable Data Bus".
U.S. Appl. No. 11/459,955, filed Jul. 26, 2006, "Computer System Having an Apportionable Data Bus".
U.S. Appl. No. 11/459,959, filed Jul. 26, 2006, "Memory System Having an Apportionable Data Bus and Daisy Chained Memory Chips".

* cited by examiner

HIGH CAPACITY MEMORY SUBSYSTEM ARCHITECTURE EMPLOYING HIERARCHICAL TREE CONFIGURATION OF MEMORY MODULES

CROSS REFERENCE TO RELATED APPLICATIONS

The present application is related to the following commonly assigned copending U.S. patent applications, filed on the same date as the present application, all of which are herein incorporated by reference:

U.S. patent application Ser. No. 11/768,995, filed Jun. 27, 2007, entitled "High Capacity Memory Subsystem Architecture Storing Interleaved Data for Reduced Bus Speed";

U.S. patent application Ser. No. 11/768,998, filed Jun. 27, 2007, entitled "High Capacity Memory Subsystem Architecture Employing Multiple-Speed Bus";

U.S. patent application Ser. No. 11/769,001, filed Jun. 27, 2007, entitled "Memory Chip for High Capacity Memory Subsystem Supporting Replication of Command Data";

U.S. patent application Ser. No. 11/769,006, filed Jun. 27, 2007, entitled "Memory Chip for High Capacity Memory Subsystem Supporting Multiple Speed Bus";

U.S. patent application Ser. No. 11/769,011, filed Jun. 27, 2007, entitled "Dual-Mode Memory Chip for High Capacity Memory Subsystem";

U.S. patent application Ser. No. 11/769,019, filed Jun. 27, 2007, entitled "Hub for Supporting High Capacity Memory Subsystem".

FIELD OF THE INVENTION

The present invention relates to digital data processing hardware, and in particular to the design and operation of memory systems and memory interconnections in a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPUs) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

A computer's CPU operates on data stored in the computer's addressable main memory. The memory stores both the instructions which execute in the processor, and the data which is manipulated by those instructions. In operation, the processor is constantly accessing instructions and other data in memory, without which it is unable to perform useful work. The design of the memory subsystem and speed at which it operates are critical issues in the overall performance of any computer system.

Memory is typically embodied in a set of integrated circuit modules. The time required to access memory is not only a function of the operational speed of the memory modules themselves, but of the speed of the path between the processor and memory. As computers have grown more complex, this path has consumed a larger share of the access time. Early computers had but a single processor and a relatively small memory, making the path between processor and memory relatively direct. Large modern systems typically contain multiple processors, multiple levels of cache, complex addressing mechanisms, and very large main memories to support the data requirements of the system. In these systems, it is simply not possible for direct paths to exist from every processor to every memory module. Complex bus structures support the movement of data among various system components. Often, data must traverse several structures between the processor and the actual memory module. As the number of processors and size of memory grows, these issues become more acute.

In order to obtain production economies of scale and reduce the cost of computing, integrated circuit memory modules have become a commodity item, having standardized external interfaces, memory capacities, and other parameters. Other computer system components which access memory, such as memory controllers, buses, repeaters, and so forth, are designed to work with these standardized memory chips. Standardization requires that certain aspects of the external interface design be fixed for a period of time, although there may be improvements to internal design. While a design is fixed, technological capabilities as well as product demand in the computer industry will continue to evolve. At some point, this evolution of capabilities and expectations will justify a new generation of memory chips designed to standards more appropriate to the current level of technology and the requirements of the industry.

Design of standardized memory modules can be optimized for any of various computer architectures and uses. It is expected that future demand will be driven largely by high-volume, smaller, general purpose computer systems, such as single-user desktops and laptops, and special-purpose devices, such as game systems, video systems, and so forth, referred to generally as low-end systems. So-called "mainframe" computer systems and other large systems will continue to be manufactured, but they will account for a relatively small proportion of total memory chip demand. It is therefore reasonable to assume that future memory module standards will be driven by the needs of the low-end, high volume market, and will be optimized for use in the devices typical of that market.

If design of future standardized memory modules is optimized for low-end systems, these modules may be inefficient when used in larger systems having different design parameters. It would be possible to design a separate set of memory modules for use in larger systems, but this would lose the economies of scale available in using high-volume, standardized memory modules, and substantially increase the cost of larger systems.

A need exists for improved memory subsystem design techniques which make it possible to use standardized memory modules in a broad range of systems and at the same time meet the operating requirements of different types of systems without undue loss of efficiency.

SUMMARY OF THE INVENTION

A high-capacity memory subsystem architecture utilizes multiple memory modules arranged in a hierarchical tree configuration, in which at least some communications from an external source (such as a memory controller or hub) traverse successive levels of the tree to reach memory modules at the lowest level.

In a preferred embodiment, a memory system comprises a memory controller having at least one memory chip bus operating at a full frequency and bus width, and which is coupled to a plurality of hub re-drive chips in a daisy chained configuration, each hub re-drive communicating with the next hub re-drive in the chain at full frequency and bus width. Each hub re-drive supports at least one respective cluster of buffered memory chips storing interleaved data, the cluster arranged in at least one tree. Command and write data is propagated down the tree, the number of chips increasing at each succeeding level of the tree. The memory chips are preferably designed for operation in a daisy-chained configuration in full bus width, full bus frequency mode (as might be typical of low-end systems) as well as for operation in at least one separate mode having reduced bus width and/or reduced bus frequency, for use in the interleaved configuration of the preferred embodiment.

Preferably, the memory subsystem has various architectural features and employs buffered memory modules as described herein and as claimed the various related applications cross-referenced above. However, it should be understood that the present invention is not necessarily limited to those implementations which employ the features claimed in the related applications, and that it would alternatively be possible to construct a memory subsystem consistent with the present invention which does not use some or any of the features claimed in the related applications.

By configuring memory chips which can be used for daisy chaining in an interleaved tree configuration according to the preferred embodiment, a larger volume of memory can be configured to a limited number of buses supported by the memory controller without using custom memory chips. Additionally, the interleaved configuration has the potential to achieve significant power savings by both reducing the frequency of bus operations of many (although not necessarily all) of the buses, and by reducing the number of I/O ports which are actually used.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Future Memory Chip Overview

Figure 1:
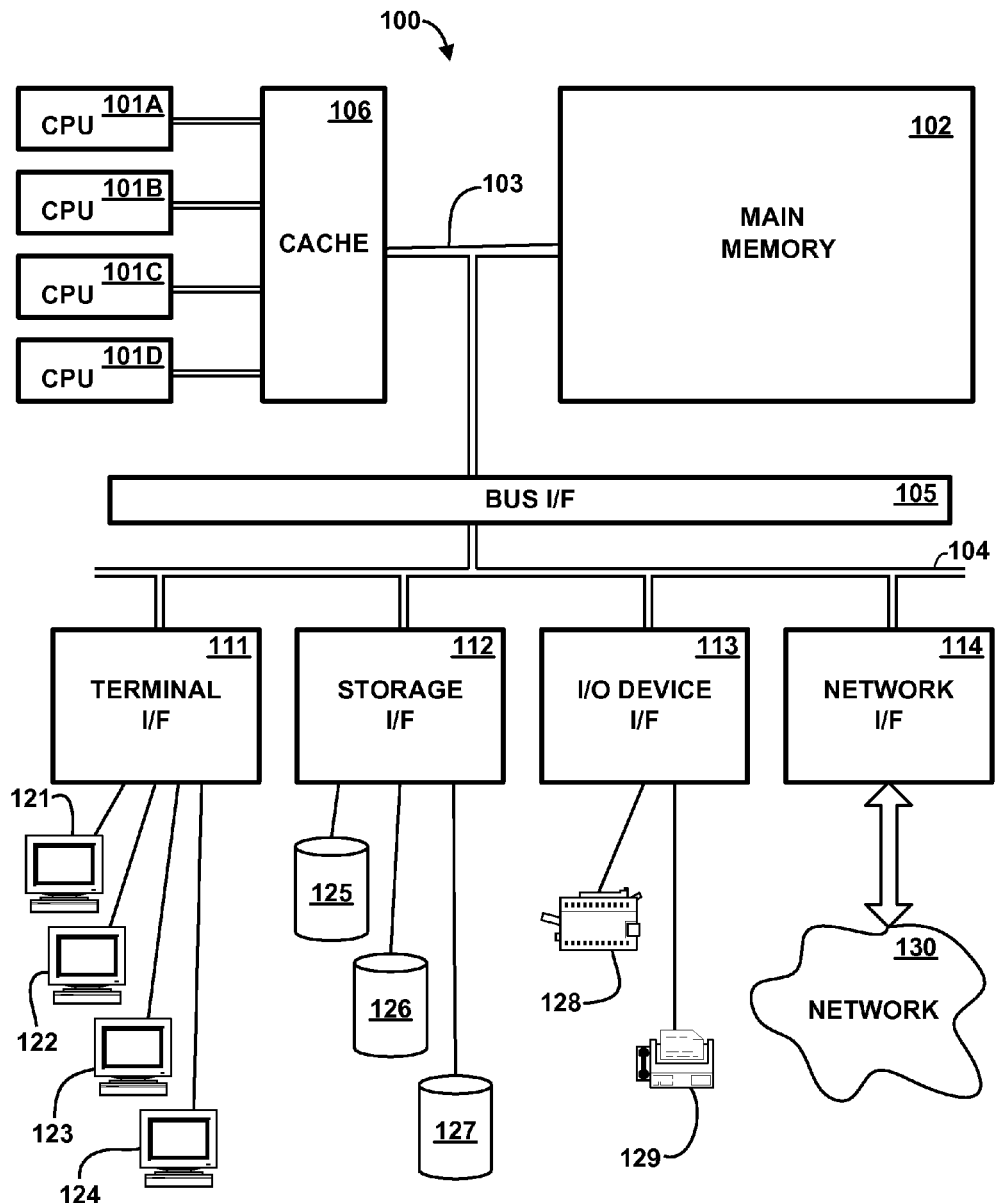
FIG. 1 is a high-level block diagram of the major hardware components of a computer system utilizing a memory subsystem having buffered memory chips, according to the preferred embodiment of the present invention.

Low-end systems typically require large memory bandwidth, i.e. the ability to read and write a large amount of memory in a given time, but do not necessarily require large memory capacities. In order to meet these requirements, the present inventors envision a buffered memory chip and memory chip architecture supporting chains of memory chips. Such an architecture is described in the following commonly assigned copending patent applications, each of which is herein incorporated by reference: U.S. application Ser. No. 11/459,956, filed Jul. 26, 2006, entitled "Daisy Chained Memory System"; U.S. application Ser. No. 11/459,957, filed Jul. 26, 2006, entitled "Memory System Having Self Timed Daisy Chained Memory Chips"; U.S. application Ser. No. 11/459,969, filed Jul. 26, 2006, entitled "Carrier Having Daisy Chained Memory Chips"; U.S. application Ser. No. 11/459,983, filed Jul. 26, 2006, entitled "Carrier Having Daisy Chain of Self Timed Memory Chips"; U.S. application Ser. No. 11/459,994, filed Jul. 26, 2006, entitled "Daisy Chainable Memory Chip"; U.S. application Ser. No. 11/459,997, filed Jul. 26, 2006, entitled "Daisy Chainable Self Timed Memory Chip"; U.S. application Ser. No. 11/459,974, filed Jul. 26, 2006, entitled "Computer System Having Daisy Chained Memory Chips"; U.S. application Ser. No. 11/459,968, filed Jul. 26, 2006, entitled "Computer System Having Daisy Chained Self Timed Memory Chips"; U.S. application Ser. No. 11/459,966, filed Jul. 26, 2006, entitled "Memory Controller for Daisy Chained Memory Chips"; U.S. application Ser. No. 11/459,961, filed Jul. 26, 2006, entitled "Memory Controller for Daisy Chained Self Timed Memory Chips"; U.S. application Ser. No. 11/459,943, filed Jul. 26, 2006, entitled "Memory Chip Having an Apportionable Data Bus"; U.S. application Ser. No. 11/459,947, filed Jul. 26, 2006, entitled "Self Timed Memory Chip Having an Apportionable Data Bus"; U.S. application Ser. No. 11/459,955, filed Jul. 26, 2006, entitled "Computer System Having an Apportionable Data Bus"; and U.S. application Ser. No. 11/459,959, filed Jul. 26, 2006, entitled "Memory System Having an Apportionable Data Bus and Daisy Chained Memory Chips".

As described therein, a buffered memory chip is designed for use in a daisy chained configuration. The memory chip has dual sets of high-frequency communications interfaces. These are intended for connection to other memory chips or a memory controller via respective point-to-point communications links (buses). One point-to-point link connects the chip with the next upstream device on the daisy chain, which could be another chip or could be the memory controller. The other point-to-point link connects the chip with the next downstream memory chip, if there is one. Daisy-chaining of point-to-point links eliminates the need for conventional buffer chips between the memory controller and the memory chips, assures that all links will be point-to-point, and therefore facilitates bus operation at a higher frequency.

Although each link has multiple data lines, the links operate in a serial manner in the sense that multiple bus cycles are required to transmit a single command or data word. Buffers in each chip temporarily store portions of data words and commands as these are transmitted over the bus.

The daisy-chain design places no restriction on the internal memory technology used for storing data within the memory chips. It is expected that dynamic random access memory (DRAM) will be most generally used, although static RAM is also possible. Furthermore, any future improvements to memory storage technologies, or new technologies altogether, can generally be accommodated within the basic framework of the buffered memory chip configuration described herein.

DETAILED DESCRIPTION

Referring to the Drawing, wherein like numbers denote like parts throughout the several views, FIG. 1 is a high-level representation of the major hardware components of a computer system 100 having a memory subsystem utilizing buffered memory chips, according to the preferred embodiment. The major components of computer system 100 include one or more central processing units (CPU) 101A-101D, main memory subsystem 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and other data are loaded into cache memory 106 from main memory 102 for processing. Main memory 102 is a random-access semiconductor memory for storing data, including programs. Although main memory 102 and cache 106 are represented conceptually in FIG. 1 as single entities, it will be understood that in fact these are more complex, and that cache may exist at multiple different levels, as is known in the art. In particular, main memory subsystem 102 comprises multiple modules and communications components, as described more fully herein.

Buses 103-105 provide communication paths among the various system components. Processor/memory bus 103 (herein referred to as front-side bus) provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology.

I/O interface units 111-114 support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary. It will further be understood that not all components shown in FIG. 1 may be present in a particular computer system. Several particular examples of such additional complexity or additional variations are disclosed herein, it being understood that these are by way of example only and are not necessarily the only such variations.

Although front-side bus 103 is shown in FIG. 1 as a relatively simple, single bus structure providing a direct communication path among cache 106, main memory 102 and I/O bus interface 105, in fact front-side bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Main memory 102 is shown in FIG. 1 as a single monolithic entity, but it will be understood that main memory may have a more complex structure. For example, main memory may be distributed and associated with different CPUs or sets of CPUs, as is known in any of various so-called non-uniform memory access (NUMA) computer architectures, or may be divided into discrete subsets for access by separate buses which collectively comprise front-side bus 103, or may form some other architecture. Similarly, although cache is shown as a single entity, there may be multiple hierarchical levels of caches, some of which may be shared by all or some of CPUs 101A-101D, and some of which may be dedicated for use of single respective CPUs. Furthermore, caches may be divided by function, so that one cache holds instructions while another holds non-instruction data which is used by the processor or processors. As used herein, a "memory subsystem" is a memory or a cache or any portion thereof. A memory subsystem may encompass all of main memory 102, or a portion of main memory 102, or all or a portion of a cache memory 106. It is specifically preferred that a memory subsystem be all or a part of main memory 102, since cache generally requires faster access, although the present invention is not limited to use in main memory and may be adaptable to some cache memory as well.

Computer system 100 depicted in FIG. 1 has multiple attached terminals 121-124, such as might be typical of a multi-user "mainframe" computer system. Typically, in such a case the actual number of attached devices is greater than those shown in FIG. 1. Although it is anticipated that a memory subsystem configuration as described herein will be most suitably adapted for use in relatively large multi-user systems, the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
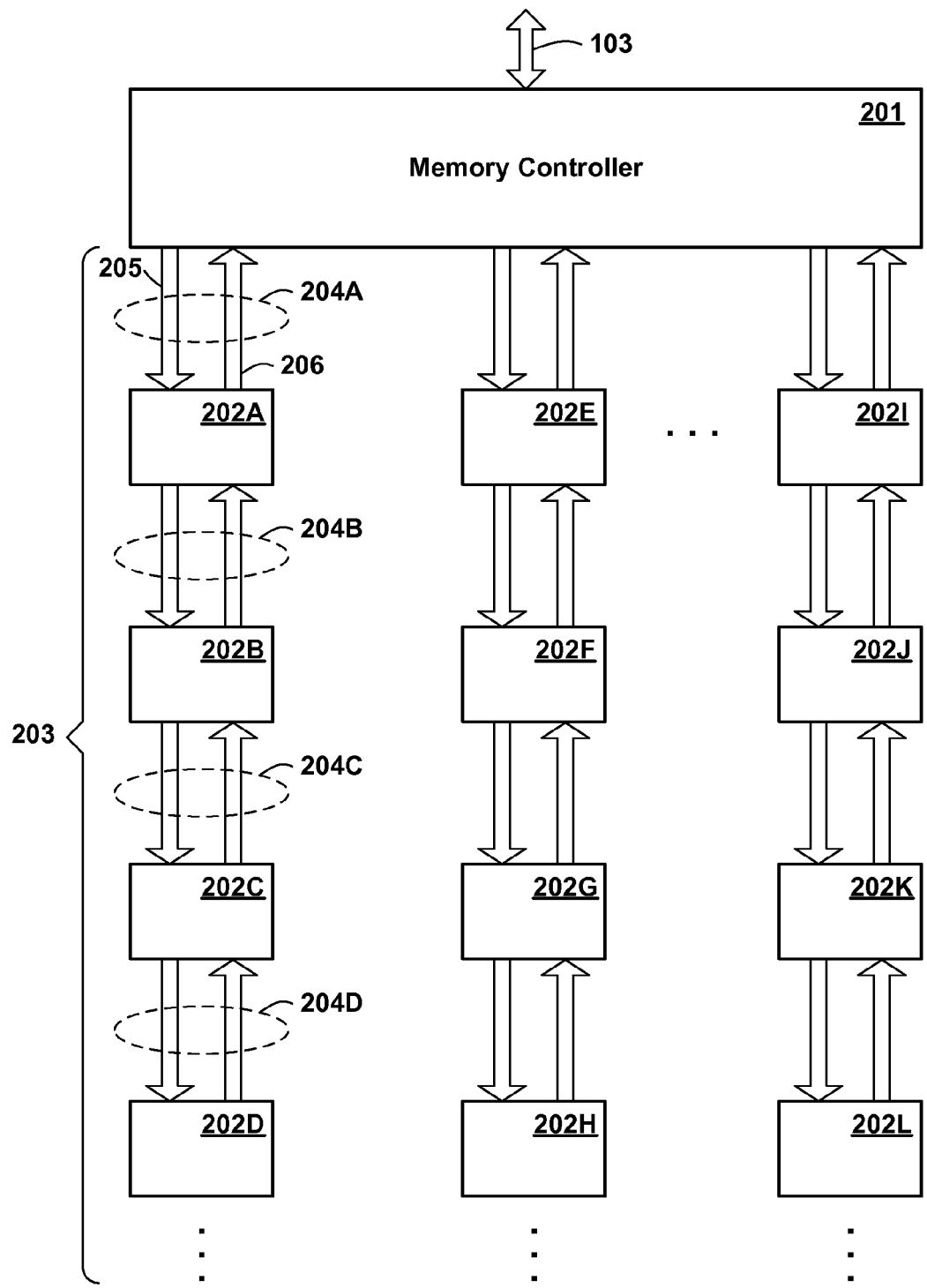
FIG. 2 is a block diagram of the major hardware components of a typical memory subsystem of a computer system in which the memory subsystem is configured using a daisy-chain configuration of buffered memory chips.

FIG. 2 is a block diagram of the major hardware components of a typical memory subsystem 102 of a computer system in which the memory subsystem is configured using a buffered memory chips in a daisy-chained configuration. As explained previously, in the preferred embodiment, buffered memory chips designed for daisy-chained configuration are used. FIG. 2 is presented as background to explain the typical daisy-chained configuration for which the memory chips are intended, although this configuration is not actually used in the preferred embodiment.

Referring to FIG. 2, memory controller 201 is coupled to system front-side bus 103 for communication with one or more processors. Memory controller in turn supports one or (typically) multiple memory chip buses configured as respective daisy-chained sets of buffered memory chips 202A-L (herein generically referred to as feature 202). Although a single memory controller and attached memory chips are represented in FIG. 2, a main memory may contain multiple memory controllers, each supporting a respective set of attached memory chips.

Each daisy-chained set 203 of memory chips 202 comprises a point-to-point link 204A running from memory controller to the first buffered memory chip in the chain, and successive point-to-point links 204B-D running from each buffered memory chip in the chain to the next buffered memory chip in the chain, until the end of the chain is reached (point-to-point links being herein generically referred to as feature 204). Memory controller 201 typically supports multiple point-to-point memory chip links 204, each capable of supporting a respective daisy-chained set of buffered memory chips. Although three daisy-chained sets are illustrated in FIG. 2, the number may vary, and could be as little as one, but is typically larger.

Each point-to-point link 204 comprises an outbound data portion 205 and an inbound data portion 206. Outbound portion 205 is used for transmitting data in an outbound direction, i.e., in a direction away from memory controller 201. In the preferred embodiment, outbound portion includes a set of command/address lines and a separate set of write data lines. The command/address lines transmit address and command data in an outbound direction to the chips. The write data lines transmit write data in an outbound direction, i.e. data coming from memory controller 201 (which obtained it over front-side bus 103) which is to be written to a memory address specified on the command/address lines. Although in the preferred embodiment separate sets of dedicated lines are used for command/address data and for write data, it would alternatively be possible to use a single shared set of lines which transmit both command/address and write data in a time-multiplexed fashion. Inbound data portion 206 transmits read data in an inbound direction, i.e., data read from a memory address responsive to a read command previously sent on the command/address lines of outbound portion 205.

In operation, memory controller 201 receives commands over front-side bus 103, and determines the daisy chained set 203 to which the command applies, i.e., the set in which the applicable address is located. In the discussion herein, it is assumed for simplicity that commands are either read commands or write commands to specific addresses, although some architectures may support other types of commands. Controller 201 then transmits each command and address on the command/address lines of outbound portion 205 of the first link 204 in the applicable daisy-chained set (and, for a write command, transmits the applicable write data on the write data lines of outbound portion 205). This data is received by the first memory module 202, and as necessary re-transmitted in a subsequent bus cycle to the next module in the daisy chained set. Re-transmission continues until the command/address data (and optional write data) reaches the module 202 to which it is applicable. At that point, the module writes data to the specified address, or reads data at the specified address. In the case of a read, the module transmits the read data toward the memory controller on inbound data portion 206. This read data is re-transmitted by every intermediate module in the daisy-chained set in subsequent bus cycles, until it reaches memory controller 201, from which it is transmitted via front-side bus 103 to the requesting entity.

In the preferred embodiment, each point-to-point link 204 is a high-speed wide serial link, i.e., it comprises multiple signal lines in parallel, but the number of lines is not sufficient to transmit a full command/address or accessible unit of data (i.e., the amount of data transferred in a single data access) in a single bus cycle. Multiple bus cycles are required to transmit a single command/address (and optional accessible unit of write data) on outbound portion 205, or accessible unit of read data on inbound portion 206. In the preferred embodiment, an accessible unit of data is 8 bytes. Outbound bus portion 205 comprises five command/address data signal lines, and thirteen write data signal lines. Inbound bus portion 206 comprises thirteen signal lines for read data. Six bus cycles at 6 gigacycles/sec (6 GT/s) are required to transmit a single command/address (30 bits maximum), write data (78 bits maximum, comprising 8 bytes of addressable data and up to 14 auxiliary bits, and read data (78 bits maximum, comprising 8 bytes of addressable data and up to 14 auxiliary bits), so that the bus is capable of transmitting commands at 1 giga-command/sec. The auxiliary bit positions can be used for error-correcting codes (ECC) or other data. In the preferred embodiment in which data is interleaved, as described in greater detail herein, one or more pairs of auxiliary bit positions can be used to support corresponding spare memory chips, which can be used to replace a malfunctioning memory chip. For illustrative purposes, these parameters are used throughout the description herein. However, it will be understood that these parameters are merely one possible representative set of design parameters, and that the number of lines, the number of serial bus cycles required for each command or data, bus frequency, etc. could vary. It should further be understood that memory chips 202 may have apportionable bus width capability in which the width of the different bus portions is variably configurable, as described in the above referenced related patent applications.

As data moves outward or inward on the daisy-chained set 203, it is received in each successive module 202, buffered in the module, and re-transmitted from the module in a subsequent bus cycle. Thus, the latency time of a memory access operation depends on the physical location of the corresponding memory module 202 within a daisy-chained set, a module at the end of the chain taking more bus cycles to access. This fact places practical constraints on the length of the daisy-chained set.

Figure 3:
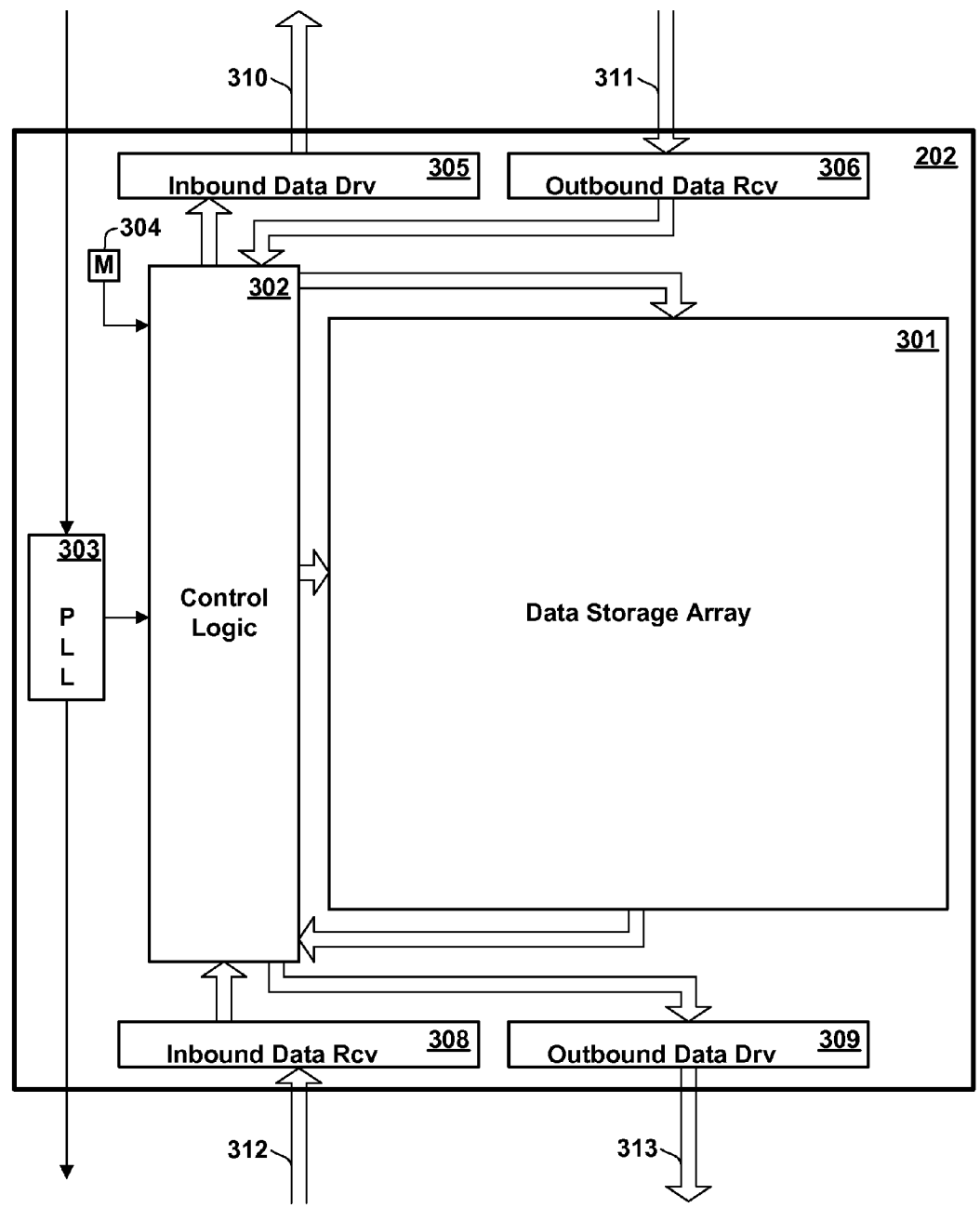
FIG. 3 is a diagram of certain major internal components of a buffered memory chip, according to the preferred embodiment.

FIG. 3 is a diagram of certain major internal components of a buffered memory chip 202, according to the preferred embodiment. Buffered memory chip comprises a random access data storage array 301 for storing data at a plurality of memory addresses, control logic for decoding received command information and controlling the operation of chip 202, phase locked loop (PLL) clock circuit 303 for generating bus timing signals, and mode control register 304 for storing a mode of operation for chip 202. Chip 202 further comprises various receive buffers 306 and 308 for receiving data through respective I/O lines 311 and 312 coupled to an external source and drivers 305 and 309 for driving (transmitting) data through respective I/O lines 310 and 313 coupled to an external source.

In accordance with the preferred embodiment of the present invention, chip 202 can operate in any of a plurality of different modes, and behaves differently, responding to the same input in a different manner, depending on the mode of operation. Mode control register 304 stores one or more bits identifying the mode of operation of chip 202. Typically, the mode of operation is not expected to change once chip 202 is configured in a computer system component, such as a printed circuit card holding multiple memory chips. Mode control register 304 represents any entity which may be configured to store a mode value, whether or not it is re-writable after manufacture. In fact, for many technologies the value of the operating mode might be permanently written into the chip at the time it is assembled into a circuit card. The purpose of a mode control register is to allow a common chip design to be used in multiple different modes (and therefore multiple different memory configurations), without requiring multiple separate chip designs.

In accordance with the preferred embodiment, the function of some receiver or driver lines may vary depending on the mode of operation of memory chip 202, as determined by mode control register 304. In a base mode of operation, intended for use in the typical daisy-chain configuration of FIG. 2, inbound data drivers 305 are used for driving data inbound toward memory controller 201 on inbound data bus portion 206; and outbound data drivers 309 are used for driving command/address data (and optional write data) outbound to the next chip 202 in the daisy chain 203 on outbound data bus portion 205. Similarly, in the base mode of operation, inbound data receiver buffers 308 receive inbound data from the next chip in the daisy chain on inbound data bus portion 206; and outbound data receiver buffers 306 receive outbound command/address data (and optional write data) from a previous chip or the memory controller on outbound data bus portion 205. Thus, in the base mode I/O lines 310 and 312 correspond to outbound data bus portions 205, and I/O lines 311 and 313 correspond to inbound data bus portions 206, of respective daisy chain links 204. In certain alternate modes of operation, the data received by certain receivers and/or driven by certain drivers may be other than that of the base mode of operation, and I/O lines 310-313 have different function, as described in greater detail herein.

PLL circuit 303 receives a bus clock signal from an external source and re-drives the signal to another external source, e.g., it receives the bus clock from a previous chip (or memory controller) in the daisy chain and re-drives it to a next chip in the chain. This signal is used to provide timing for transmissions on the data and command/address bus portions. In the preferred embodiments, chip 202 supports different bus frequencies, depending on the mode of operation, and in some variations of the preferred embodiments herein chip 202 supports multiple bus frequencies simultaneously, i.e., different portions of the bus operate at different frequencies. PLL multiplies the incoming frequency as required to provide a bus clock signals of the highest required frequency to control logic 302, which generates any required lower frequency bus clock signals by counting cycles at the higher frequency.

In general, control logic 302 interprets command/address data received, determines whether the data is intended for chip 202, or another chip, or both, accesses data storage array 301 in response to a command intended for chip 202, returns read data to the memory controller, and re-drives data as required to another chip or chips. Control logic 302 operates in multiple modes, depending on the setting of mode register 304. The interpretation of incoming data will depend on the operating mode. As explained above, in base mode command and address data is received at five dedicated I/O ports of outbound data receive buffer 306; however, in certain alternative modes of operation, at least some command/address data is received at other ports or buffers.

Memory chips 202 are designed for use in the configuration of FIG. 2 for typical low-end systems, i.e. single-user computers, portable digital devices, game controllers, so-called "set-top box" video controllers, and the like. If the same chips are adapted for use in large computer systems, the configuration of FIG. 2 has certain drawbacks. Large computer systems typically require much larger main memory capacity than low-end systems. It may be possible to some degree to increase memory capacity by employing multiple memory controllers 201, but each additional memory controller imposes substantial burdens on the design of front-side bus 103. It is further possible to increase memory capacity almost indefinitely by increasing the length of the daisy chains. However, increasing the length increases the latency of access. For large capacity memory subsystems, latency becomes impractically large. Additionally, long daisy chains are relatively inefficient users of electrical power. Each module must buffer and re-transmit the transmissions to and from the modules further down the chain, so that substantial power is consumed just communicating data out to the chips.

Figure 4:
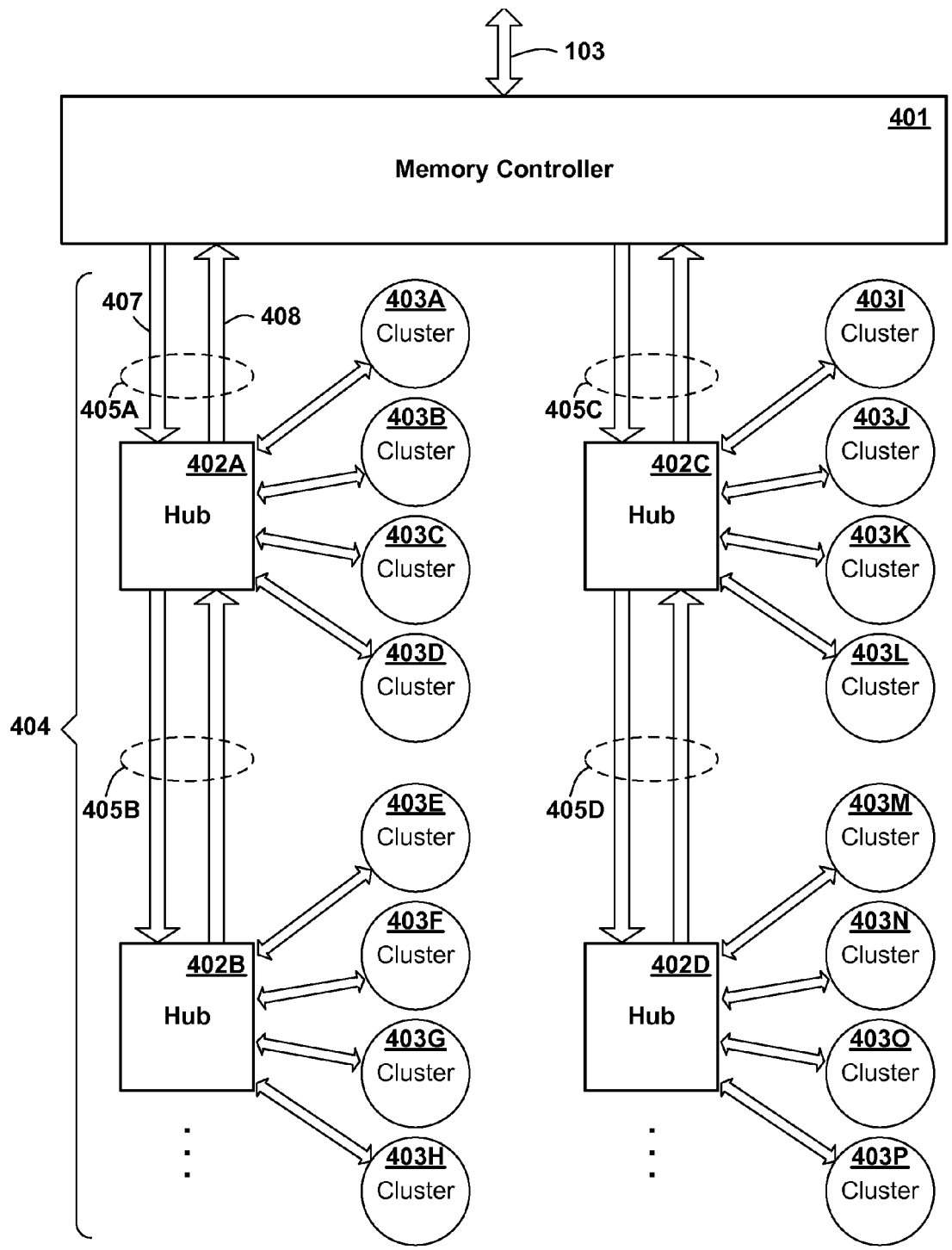
FIG. 4 is a high-level block diagram of a memory subsystem configured using hubs and clusters, according to the preferred embodiment of the present invention.

In accordance with the preferred embodiment of the present invention, these drawbacks are alleviated by arranging buffered memory chips 202 in chip clusters supported by daisy-chained hubs. FIG. 4 is a high-level block diagram of a memory subsystem configured using hubs and clusters, according to the preferred embodiment of the present invention.

Referring to FIG. 4, memory controller 401 is coupled to front-side bus 103 for communication with one or more processors. Memory controller 401 in turn supports one or (typically) multiple memory chip buses configured as respective daisy-chained hubs 402A-D (herein generically referred to as feature 402), each hub supporting at least one (and preferably multiple) clusters of memory chips 403A-O (herein generically referred to as feature 403). A main memory 102 may contain multiple memory controllers 401, each supporting a respective set of attached hubs and chip clusters.

As in the case of the daisy-chained chips of FIG. 2, the hubs 402 of the preferred embodiment are connected in chains 404 by point-to-point links 405A-D (herein generically referred to as feature 405), running from memory controller 401 to the first hub, and thereafter from each hub to a successor hub in the chain until the end of the chain is reached. Memory controller 401 typically supports multiple point-to-point hub links 405, each capable of supporting a respective daisy-chained set 404 of hubs and clusters. Although two daisy-chained hub sets are illustrated in FIG. 4, the number may vary, and is typically larger.

Each point-to-point link 405 comprises an outbound data portion 407 and an inbound data portion 408. Preferably, point-to-point links 405 operate in essentially the same manner as point-to-point links 204 running between daisy-chained buffered memory chips 202 in the configuration of FIG. 2. Specifically, in the preferred embodiment the bus frequency of bus link 405 is the same as that of bus link 204, and each data access transaction (read or write) requires multiple (e.g. 6) cycles to transmit. Inbound data portion 408 is preferably the same bus width (same number of lines) as inbound data portion 206 (e.g. 13 lines each). Outbound data portion 407 also uses 13 lines for transmission of outbound write data, plus some number of lines for transmission of command/address data. Outbound data portion 407 preferably supports a similar address and command protocol to that of the outbound data portion 205 of a link 204 in a daisy-chain 203 of memory chips, but may require one or more additional address lines to accommodate a larger potential address space, since one purpose of the arrangement of the preferred embodiment is to support a larger number of chips (larger memory address range) on each memory chip bus port supported by the memory controller.

In operation, memory controller 401 receives commands over front-side bus 103, and determines the daisy chained hub/cluster set 404 to which the command applies, i.e., the set in which the applicable address is located. Controller 401 then transmits each command and address (together with write data, if the command is a write command) on outbound data portion 407 to the first hub in the applicable daisy-chained hub/cluster set, which receives it and retransmits it as necessary in a subsequent bus cycle to the next hub, until the hub servicing the cluster 403 storing the applicable data address is reached. The hub then re-transmits the command/address (and write data, if applicable) to the memory modules of the applicable cluster 403, as described in greater detail herein. When the command/address is re-transmitted to the cluster, the extra address bits needed to specify a hub and cluster are preferably removed to reduce the width of address required. Data is preferably interleaved among multiple modules of a cluster, as described more fully herein. The modules of the cluster write any write data to the specified address, or read data specified by a read command, returning the read data to the hub. The hub then transmits the data up the chain toward the memory controller on inbound data portion 408, each intermediate hub in the chain re-transmitting the data in a respective subsequent bus cycle until it reaches memory controller 401, from which it is transmitted via front-side bus 103 to the requesting entity.

In accordance with the preferred embodiment of the present invention, a "cluster" 403 of memory chips is a set of multiple memory chips storing data, and configured so that all chips of the cluster are accessed in each transaction to the cluster. In other words, data within the cluster is interleaved among all the chips of the cluster. Interleaving may be on a bit-wise basis, by multiple bits, by bytes or words, or on some other basis. In addition to interleaving data, in the preferred embodiment at least a portion of the communication links running to the chips operate at a bus frequency which is lower than that of the links 405 of the hub chain 404. Despite the lower frequency, the use of interleaving allows the chips to transmit or receive data at a rate equivalent to the data rate of the hub chain 404. The use of hubs and clusters thus increases the number of chips supported on each bus chain 404 attached to the memory controller (vis-a-vis a daisy-chain of chips as shown in FIG. 2), and at the same time reduces the average power consumed by each chip by lowering bus frequency. A cluster 403 of memory chips may be implemented in any of various configurations. Several representative such configurations are described below, it being understood that the exemplary configurations explained herein are not exhaustive.

Figure 5:
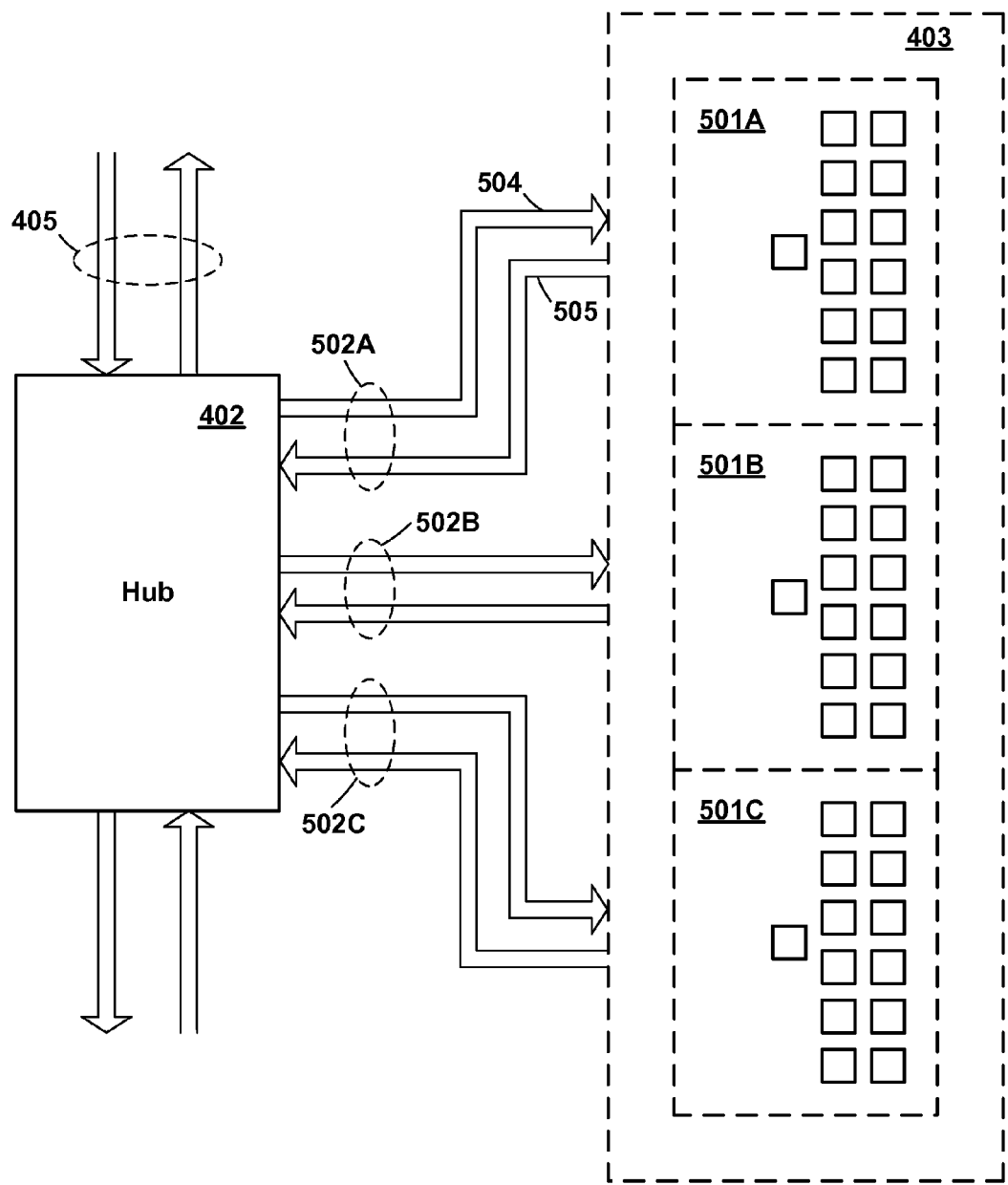
FIG. 5 is a block diagram showing in greater detail the links between a hub and an associated cluster of memory chips, according to certain variations of the preferred embodiment.

FIG. 5 is a block diagram showing, in greater detail than the representation of FIG. 4, the links between a hub and an associated cluster of memory chips, according to certain variations of the preferred embodiment. As shown in FIG. 5, a cluster 403 comprises 39 chips 202, arranged in three sub-clusters 501A-C (herein referred to generically as feature 501). Hub 402 is coupled to a separate sub-cluster communications link 502A-C (herein generically referred to as feature 502) for each sub-cluster 501. Each sub-cluster communications link comprises a respective command/address/write data portion 504 for transmitting command/address data (and optional write data in the case of a write command to the chips of the sub-cluster, and a respective read data portion 505 for receiving data read from the chips of the cluster, to be re-transmitted to the memory controller. Preferably, command/address/write data portion includes separate sets of lines for command/address data and for write data, the number of lines required being dependent on the configuration, of which several examples are discusses below; however, command/address data could alternatively be time-multiplexed with write data to share a single set of lines. For clarity only one cluster is shown attached to the hub in FIG. 5, although it will be understood that a hub can, and typically will, service multiple clusters.

Figure 9:
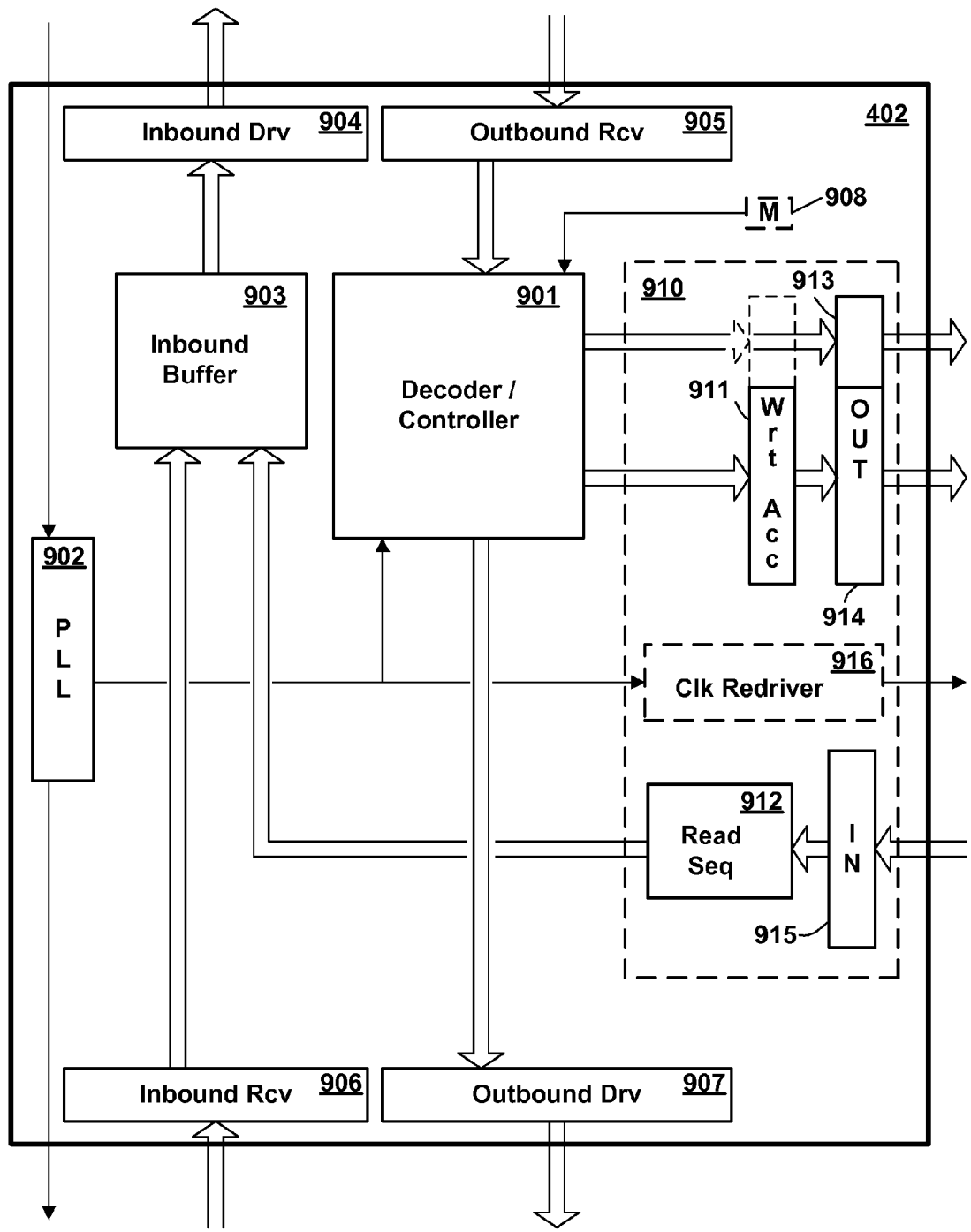
FIG. 9 is a block diagram showing certain major internal components of a hub for supporting one or more clusters of memory chips, according to the preferred embodiment.

Hub 402 is essentially a complex switch with the capability to accumulate/sequence data between busses operating a different frequencies. FIG. 9 is a block diagram showing certain major internal components of a hub, according to the preferred embodiment. Hub 402 comprises a decoder/controller 901 for decoding received addresses and controlling the operation of the hub; phase locked loop (PLL) clock circuit 902 for generating bus timing signals; inbound data buffer 903 for buffering inbound data; receive buffers 905 and 906 and drivers 904 and 907 for receiving and driving (transmitting) data on links 405 of a hub chain to which hub 402 belongs, and at least one cluster interface 910 for interfacing with a cluster 403 of memory chips.

Hub 402 optionally contains a mode register 908 coupled to decoder/controller 901, which identifies a mode of operation. Hub 402 can optionally be designed to support multiple different cluster configurations, several examples of which are disclosed below and in FIGS. 6-8, and/or can be designed to support other operational variants. For example, different configurations might require any of: a different number of command/address lines and different bus frequency of at least some lines; a different number of sub-clusters within a cluster; a different granularity of data interleave, etc.

Cluster interface 910 comprises a write accumulator 911, read sequencer 912, command/address line output driver 913, write data output driver 914, and inbound read data receive buffer 915. Although only one interface 910 is represented in FIG. 9 for clarity of illustration, it will be understood that a separate interface exists for each cluster 403 supported by hub 402.

Write accumulator 911 accumulates data to be transmitted to the cluster at a lower frequency from that at which it was received over bus 405 from the memory controller. I.e., data received in multiple bus cycles over bus 405 is accumulated in a wider register until it is of sufficient width for transmitting at the lower speed, wider width outbound link(s) 504 to the cluster. Preferably, at least some data is sent out at a lower bus speed. Specifically, in all of the exemplary configurations disclosed herein, write data for writing to the chips is transmitted on link(s) 504 at a reduced bus speed. In one exemplary configuration, address/command data is also transmitted at a lower bus speed. After passing through write accumulator to adjust the width as necessary, received data intended for the cluster supported by cluster interface 910 is transmitted out to the cluster on command/address line output driver 913 (for command/address data), write data output driver 914 (for write data).

Read sequencer 912 sequences wider width inbound read data received over link(s) 505 into read buffer 915 for transmission to the memory controller in multiple cycles on narrower width inbound portion 408 of link 405. The sequenced data is placed in inbound buffer 903 for re-transmission on inbound driver 904 toward the memory controller.

In operation, decoder/controller 901 decodes the address of a received command/address to determine whether the command is intended for a cluster supported by hub 402. If so the incoming data is routed to the corresponding cluster interface 910. If not, the incoming data is routed to outbound driver 907, passing it through hub 402 to the next hub in daisy-chain 404. (Some architectures may support broadcast commands which are both routed to a cluster interface and passed down the daisy chain.)

PLL circuit 902 receives a bus clock signal from an external source and re-drives the signal to another external source, e.g., it receives the bus clock from a previous hub (or memory controller) in the daisy chain and re-drives it to a next hub in the chain. Optionally, each cluster interface further includes a clock re-driver 916 for re-driving the bus clock signal to one or more chips of the cluster, although a clock for these chips might be generated by separate means. The clock signal derived from PLL 902 is also provided to decoder/controller 901 for controlling the internal operation of hub 402.

As explained earlier, in the exemplary embodiments, a memory access operation stores or reads 78 bits of data (including auxiliary bits). The data within a cluster 403 is interleaved among the 39 chips of the cluster, so that any memory access operation which addresses the chips of a cluster is distributed among all 39 chips, i.e. each chip stores or reads exactly two bits of every memory access operation which accesses the cluster. Because each chip within the cluster is required to receive only two bits of write data or transmit only two bits of read data in each memory access operation, the lines which carry this data can operate at a lower frequency than the lines of the communications links 405 which make up the hub chain 404. For example, in the exemplary embodiment, links 405 operate at a bus frequency of 6 GT/s, requiring 6 bus cycles to complete a memory access operation. Since each chip in the cluster can receive or transmit two bits of data on a single line in two bus cycles, it can receive or transmit its respective portion of the memory access data in 2 bus cycles, and therefore can achieve sufficient data rate at a bus frequency (on link 502) of 2 GT/s.

It will be observed that each chip 202 contains a total of 31 receivers for receiving data on 31 I/O lines and 31 drivers for transmitting data on 31 I/O lines. In the base operating mode, these operate as 13 outbound data, 13 inbound data, and 5 command/address for each of receiver I/O and driver I/Os. The number of physical receiver and driver I/O lines supported is a significant limitation. Since each I/O line is a significant cost burden, it is unlikely that a generic chip will be designed with any more I/O than minimally necessary. Therefore, it is desirable that any alternative configurations of a memory subsystem use no more I/O lines than the number required in the base (i.e., daisy-chained) configuration of FIG. 2. However, it is relatively low-cost to provide additional function in control logic 302 which will use different I/O lines differently, depending on the operating mode, and it is therefore acceptable to configure the memory subsystem in alternative configurations which assign different roles to some of the I/O lines.

Figure 6:
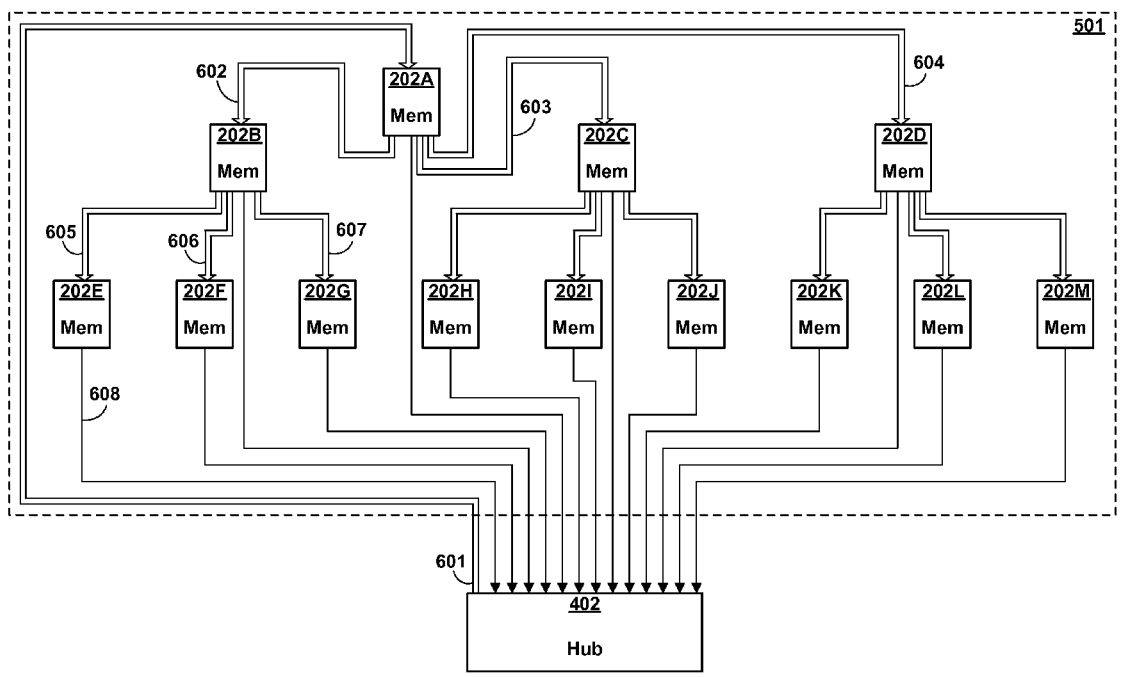
FIGS. 6-8 represent in greater detail various configuration of data paths among memory chips of a sub-cluster and the associated hub, according to a first, second and third variation, respectively, of the preferred embodiment.
Figure 7:
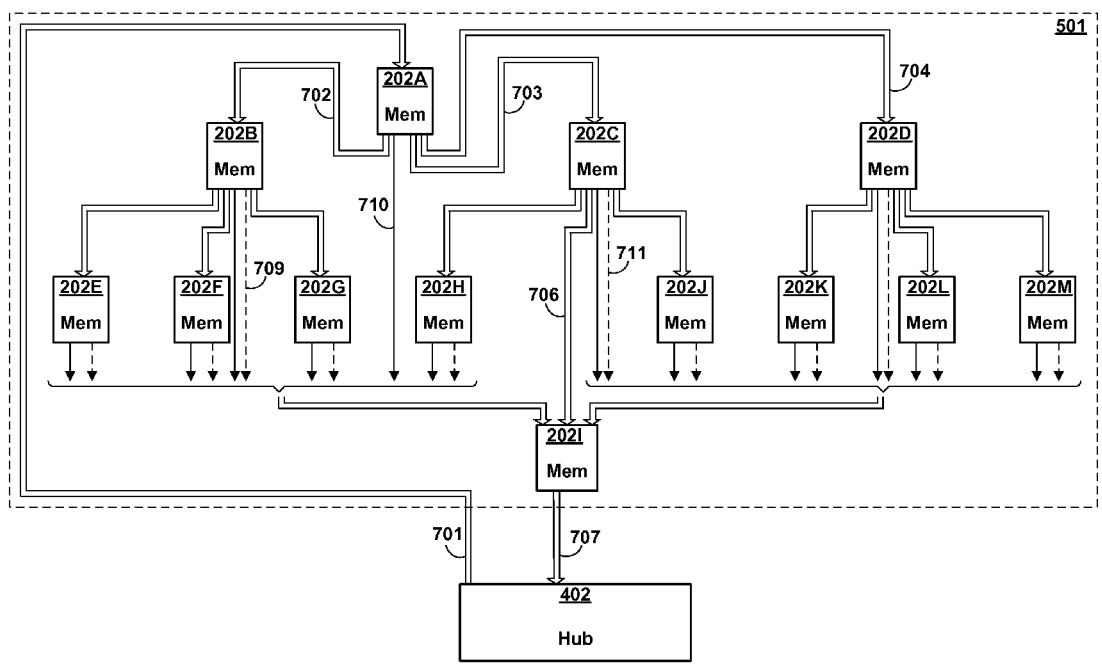
Figure 8:
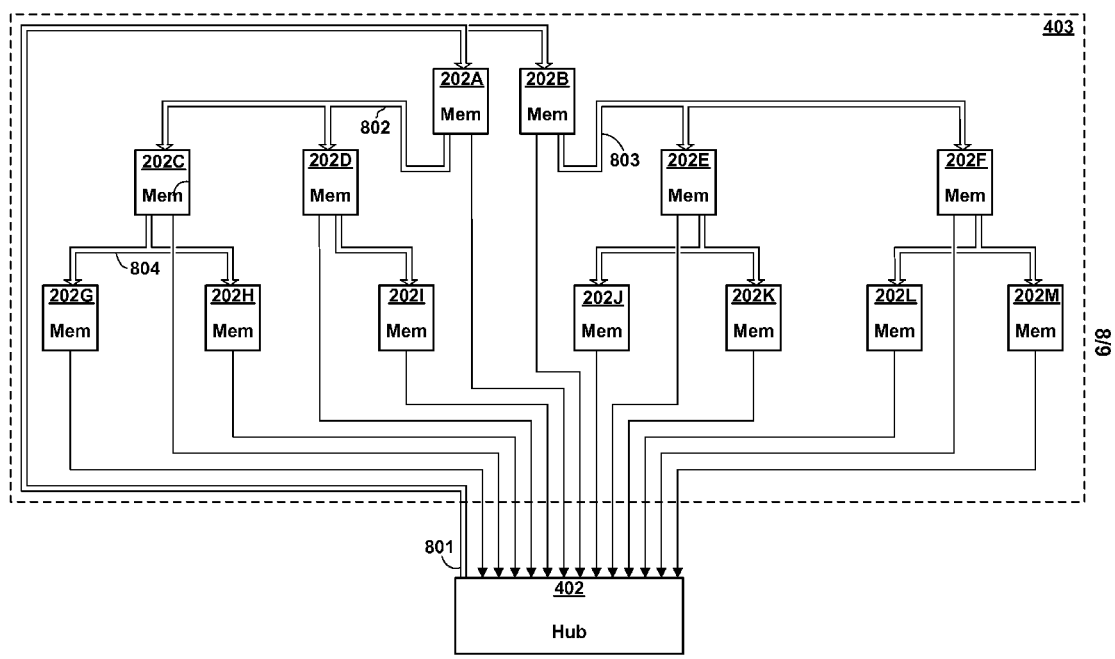

FIGS. 6-8 represent in greater detail various alternative configurations of data paths among memory chips of a sub-cluster and the associated hub, according to certain variations of the preferred embodiment. In the variations of FIGS. 6-8, each cluster 403 contains three sub-clusters 501, each sub-cluster containing 13 memory chips, as represented in FIG. 5 and described above. All three sub-clusters 501 of a single cluster 403 are serviced by the same hub 402, although the other sub-clusters are omitted from FIGS. 6-8 for clarity of illustration.

Referring to FIG. 6, which represents a first variation of a sub-cluster configuration 501, an outbound link 601 runs from hub 402 to memory chip 202A, outbound link 601 comprising 13 data lines and 5 command lines for transmitting write data and command/address data, respectively, to memory chip 202A. The 13 data lines operate at a bus frequency of 2 GT/s, i.e. ⅓ that of the communication links 405 of the hub chain. The 5 command/address lines operate at a bus frequency of 6 GT/s.

Memory chip 202A in turn drives three separate outbound links 602, 603, 604 to memory chips 202B, 202C and 202D, respectively. Each outbound link 602, 603, 604 from memory chip 202A comprises 4 data lines operating at a bus frequency of 2 GT/s, and 5 command/address lines operating at a bus frequency of 6 GT/s.

Each of memory chips 202B, 202C and 202D in turn drives three separate outbound links to a respective group of three additional memory chips. For example, memory chip 202B drives three separate outbound links 605, 606, 607 to memory chips 202E, 202F and 202G, respectively. Each outbound link 605, 606 and 607 comprises 1 data line operating at a bus frequency of 2 GT/s, and 5 command address lines operating at a bus frequency of 6 GT/s.

Each memory chip 202A-202M drives a single inbound data line operating at 2 GT/s to hub 402. E.g., memory chip 202E drives inbound data line 608.

Thus, it will be seen that the sub-cluster is configured as a tree of memory chips with chip 202A at its root, and in which command/address data and write data is propagated down the tree. However, a direct connection exists for transmitting read data from each chip to the hub, i.e. it is not necessary to propagate read data up the tree.

Although data is transferred on hub bus links 405 at 6 GT/s, the cluster configured as shown in FIG. 6 is able to keep up with the transfer rate because data is interleaved among the three sub-clusters. I.e., for each bus operation transferring 78 bits of addressable data and auxiliary bits, 26 bits are stored in each of the three sub-clusters, and each memory chip stores exactly two bits. Each chip requires only two bus beats to transfer the two bits (on the single inbound bit line 608), whereas the hub requires six bus beats to transfer its 78 bits of data up the hub chain 404 to memory controller 401. Therefore the individual chips of the cluster are able to keep up with the hub's data rate by transferring data to the hub at 2 GT/s. The same is true of outbound write data from the hub to the chips.

However, in the case of outbound command/address data, it is necessary to replicate the command/address data to all chips of the cluster, and therefore interleaving does not reduce the amount of command/address data to each chip. In the exemplary configuration of FIG. 6, this problem is resolved by operating the command/data portion of the outbound links at 6 GT/s, the same bus frequency as hub chain links 405. I.e., in this embodiment, some lines of the bus operate at a higher frequency than others. Per chip power reduction vis-a-vis a daisy chained configuration as shown in FIG. 2 is accomplished by virtue of the fact that some of the lines operate at lowered frequency (whereas in the daisy chained configuration, all lines operate at 6 GT/s), and by virtue of the fact that some chips use fewer than all of the lines.

In operation, hub 402 receives successive portions of command/address data (and optionally write data) from the chain 404 in successive bus cycles. Preferably, address data identifying the cluster is included in the first bus cycle or cycles to reduce latency. If sufficient information is received to determine the destination cluster, hub 402 determines, with respect to each cluster attached to the hub, whether the command is addressed to the cluster. If not, the command is ignored by the hub, but is forwarded down the chain 404. If so, the command is re-transmitted to each of the three memory chips 202A at the root of the tree in the respective sub-clusters of the cluster to which the command is addressed on the five command/address lines of link 601 for each cluster, i.e., at 6 GT/s. If the command is a write command, the hub will also receive write data on its 13 outbound data input lines from the memory controller. This write data is re-transmitted in an interleaved fashion to the three sub-clusters, the root memory chip 202A of each sub-cluster receiving write data at 2 GT/s on the 13-line data portion of link 601.

Memory chip 202A then re-transmits three separate copies of the command/address data on three separate 5-line 6 GT/s portions of links 602, 603 and 604, respectively, to chips 202B, 202C and 202D, respectively. However, if the command is a write command, it is not necessary for chip 202A to retransmit all the write data. The 13-bit portion of link 601 carries one bit for each of memory chips 202A-202M. Therefore, it is only necessary to re-transmit four data bits to memory chip 202B on link 602 (at 2 GTS), four bits to memory chip 202C on link 603 (at 2 GT/s), and four bits to memory chip 202D on link 604 (at 2 GT/s). The 13$^{th}$ bit is for memory chip 202A itself, and is not re-transmitted.

Each of memory chips 202A, 202B and 202C then re-transmits three more copies of the 5-bit command/address data at 6 GT/s to a respective group of three chips. I.e., Chip 202B re-transmits data to chips 202E-202G, and so on, as shown in FIG. 6. On this re-transmission, it is only necessary to transmit a single bit of write data at 2 GT/s to each chip (in addition to the five bits of command/address data).

If the command is a read command, each chip transmits the corresponding read data from the chip on a respective 1-bit line 608 directly to hub 402 at 2 GT/s. Each chip stores only two bits of the 78 bits of read data per bus operation, and therefore by operating at 2 GT/s, each chip is able to transmit the required data within the time for completing the bus operation. Because the command/address data is propagated to the chips in a tree configuration, the chips do not all receive it at the same time. Preferably, hub 402 is designed to buffer incoming data from the various chips to account for this delay. Alternatively, a one or two delay could be introduced in those chips receiving the command earlier before transmitting the read data to hub 402, so that hub 402 receives all data at the same time.

It is contemplated that memory chips 202 will be designed around requirements of low-end systems, and designed to be configured in the daisy-chained configuration of FIG. 2 as their base mode of operation (although this is not necessarily a requirement of the present invention). In order to be able to use the same generic chip 202 which is intended for use in low end, daisy-chained configurations, it is highly desirable that any alternative configurations as disclosed herein require as little additional chip circuitry as possible, and in particular, it is highly desirable that the chip in any alternative configuration require no more I/O pins than used in the standard daisy-chained configuration. Each additional I/O pin adds significant expense to the design and manufacture of the chip, and it is unlikely that chip designers will add additional pins to support alternative configurations which are used only in a small proportion of installed environments. As explained above, chip 202 of the exemplary embodiment has 62 I/O pins, comprising 18 pins for receiving outbound data coming from the controller (13 data and 5 command/address), 18 pins for re-driving the outbound data to the next chip in the daisy chain (13 data and 5 address/command), 13 pins for receiving inbound data coming from the next chip in the daisy chain, and 13 pins for re-driving the inbound data toward the controller. Of the 62 I/O pins, 31 are drivers for transmitting on an external line, and 31 are receiver for receiving from an external line. It will be understood that these are provided as exemplary design parameters, and that a memory chip for use in accordance with the present invention could have a different number of I/O pins.

In all of the configurations disclosed herein, the number of transmitting and receiving pins used in each chip of the configuration is limited to 31 and 31, respectively, although the function of the pins (i.e., the type of data being driven or received on the pin) is not necessarily the same as in the daisy chained configuration. A mode register 304 which records an operating mode, and a small amount of additional internal chip logic 302 responsive to the operating mode held in the mode register, is required to decode the input lines or transmit to output lines accordingly. This internal chip logic is far less expensive than additional I/O pins, and therefore is practical to support in a generic chip design even if a relatively small proportion of installed chips actually use it.

Appropriate assignment of function to the various pins can minimize the internal logic needed to support an alternative configuration. The table below shows an exemplary assignment of pin function to the 31 receiver pins (R1 through R31) for receiving data and 31 driver pins (T1 through T31) for transmitting data in the base mode of operation (intended for use in the daisy chained configuration of FIG. 2), and in the alternative configuration mode of FIG. 6. In the alternate mode, read data 1 and write data 1 refer to the bit which is stored in the chip, while write data 2:13 is data stored in interleaved fashion on other chips of the same sub-cluster (which must therefore be propagated to the other chips). As will be observed, most pins either have the same function in alternative mode or are not used in alternative mode (and hence no special logic required). In alternative mode, internal logic uses only data bit 1 (read or write) for the chip, and data bits 2:13 are treated as pass-through data intended for another chip. Only pins T20:T29 have a different function, being used to drive additional copies of the command data in the alternative mode. Additionally, the control logic 302 responsive to the operating mode will operate the data pins in alternative mode at a different clock rate, i.e., pins R6:R18 and T7:T19 are operated at ⅓ bus clock rate (e.g., 2 GT/s, as opposed to 6 GT/s). Power savings result from the lowered clock rate, as well as the fact that some pins are not used in alternative modes.

TABLE 1

Pin Assignments for Base and Alternate mode (FIG. 6)

| | Base Mode | Alt Mode (FIG. 6) |
|---|---|---|
| R1:R5 | Cmd 1:5 | Cmd 1:5 |
| R6 | Outbound Wrt Data 1 | Outbound Wrt Data 1 (chip), ⅓ clock |
| R7:R18 | Outbound Wrt Data 2:13 | Outbound Wrt Data 2:13, ⅓ clock |
| R19:R31 | Inbound Read Data 1:13 | Not Used |
| T1:5 | Cmd 1:5 | Cmd 1:5 |
| T6 | Outbound Wrt Data 1 | Not Used |
| T7:T18 | Outbound Wrt Data 2:13 | Outbound Wrt Data 2:13, ⅓ clock |
| T19 | Inbound Read Data 1 | Inbound Read Data 1 (Chip), ⅓ clock |
| T20:24 | Inbound Read Data 2:6 | Cmd 1:5 (Copy B) |
| T25:29 | Inbound Read Data 7:11 | Cmd 1:5 (Copy C) |
| T30:31 | Inbound Read Data 12:13 | Not Used |

The single set of alternative mode pin assignments from the table above can be used for all chips of the alternative configuration of FIG. 6, although only chip 202A actually uses all the pin assignments listed. The other chips will use fewer pins. For example, chip 202B will receive only 4 bits of write data, so it needs only R6:R9 for receiving outbound write data, leaving pins R10:R18 unused. Similarly, it transmits only 3 bits of write data to other chips, so it needs only T7:T9 for transmitting outbound write data, leaving T10:T18 unused.

It will be understood that the pin assignments of the table above are merely one possible assignment set, and that other assignments could be used. Similar assignments could be made for the various other configurations described herein, as long as the total number of receiving and transmitting pins does not exceed what is available.

FIG. 7 represents a second variation of a sub-cluster configuration 501. The configuration of FIG. 7 is similar to that of FIG. 6, and operates in a similar manner, except that the read data from memory chips 202A-202H and 202J-202M is transmitted to chip 202I, rather than directly to hub 402. Chip 202I in turn transmits this read data, along with its own read data, to hub 402.

Referring to FIG. 7, an outbound link 701 runs from hub 402 to memory chip 202A, outbound link 701 comprising 13 data lines and 5 command lines for transmitting write data and command/address data, respectively, to memory chip 202A. The 13 data lines operate at a bus frequency of 2 GT/s, while the 5 command/address lines operate at a bus frequency of 6 GT/s.

Memory chip 202A in turn drives three separate outbound links 702, 703, 704 to memory chips 202B, 202C and 202D, respectively. Each outbound link 702, 703, 704 from memory chip 202A comprises 4 data lines operating at a bus frequency of 2 GT/s, and 5 command/address lines operating at a bus frequency of 6 GT/s. Each of memory chips 202B, 202C and 202D in turn drives three separate outbound links to a respective group of three additional memory chips, each such link comprising 1 data line at 2 GT/s and 5 command/address lines at 6 GT/s, as in the configuration of FIG. 6.

Each memory chip 202A-H and 202J-202M drives a single inbound data line operating at 2 GT/s to memory chip 202I. E.g., memory chip 202E drives inbound data line 708. Memory chip 202I receives this data, and forwards it on inbound link 707 to hub 402, along with its own data. Inbound link 707 is a 13-line link operating at 2 GT/s, and contains the data from each of chips 202A-202M.

Although the configuration of FIG. 7 necessarily requires an extra cycle of latency to read data when compared with that of FIG. 6, it has certain potential advantages. All read lines going to hub 402 come from a single chip, i.e. chip 202I, which may simplify timing or physical layout issues. Another advantage of the configuration of FIG. 7 is that sufficient ports exist to provide a redundant inbound line from each of memory chips 202A-202H and 202J-202M. These redundant inbound lines are shown as dashed lines 709, 711 in FIG. 7. In the event of failure of any of the primary inbound ports or lines, the redundant line can assume the function of the original. Memory chip 202I therefore has 12 receiver pins assigned to the primary inbound lines 708 and 12 receiver pins assigned to the redundant inbound lines 709, 711. Since chip 202I only needs 6 additional receiver pins for receiving 1 bit of write data and 5 bits of command/address data from chip 202C on link 706, the total pin requirement is 30 pins (leaving one unused). Where redundancy is desired, link 707 preferably contains a single additional redundant line, which can be assigned as a back-up for any of the 13 inbound read lines from chip 202I to hub 402. Redundancy could be provided in the configuration of FIG. 6 as well, but it would require 13 extra receive ports in the hub, which significantly increases the cost.

If desired, redundancy can also be provided in the outbound links. I.e., with one exception, sufficient unused ports exist to provide an extra redundant line for each of the outbound links 701-704, 706. This one exception is chip 202A, which has 3 outbound links 702, 703, 704, each having nine lines. If a 10$^{th}$ redundant line is added to each of links 702, 703, and 704, there are no unused lines left over, leaving the data line 710 to chip 202I without redundancy. The solution to this problem is to share the redundant line for link 703. I.e., if line 710 fails, then the read data is transmitted on the redundant line of link 703 to chip 202C, and thence on redundant line 711 for chip 202I's data. Redundancy would involve additional complexity in the internal logic, but would not require additional I/O ports.

An exemplary pin assignment for the configuration of FIG. 7 employing redundancy as described above is represented in Table 2 below. It is assumed that the pin assignments for the base operating mode are the same as those of Table 1 above. Lines R6:18, R20:31, and T7:19 operate at ⅓ clock speed; some other lines may operate at ⅓ clock speed as well, depending on configuration or use. I.e., a redundant line will operate, when used, at the clock speed of the line it is replacing.

TABLE 2

Pin Assignments for Second Alternate mode (FIG. 7)

| | Chip 202A | Chip 202I | All Other Chips |
|---|---|---|---|
| R1:R5 | Cmd 1:5 | Cmd 1:5 | Cmd 1:5 |
| R6 | Outbound Wrt 1 | Outbound Wrt 1 | Outbound Wrt 1 |
| R7:9 | Outbound Wrt 2:4 | Red'nt inbound read 2:4 | Outbound Wrt 2:4 |
| R10:18 | Outbound Wrt 5:13 | Red'nt inbound read 5:13 | Not Used |
| R19 | Redundant link 701 | Red'nt link 706 | Redundant cmd/data in |
| R20:31 | Not Used | Inbound Read 2:13 | Not used |
| T1:5 | Cmd 1:5 (Copy A) | Not Used | Cmd 1:5 (Copy A) |
| T6 | Redundant link A | Not Used | Redundant Link A |
| T7:9 | Outbound Wrt 2:4 | Not Used | Outbound Wrt 2:4 |
| T10:17 | Outbound Wrt 5:12 | Not Used | Not Used |
| T18 | Outbound Wrt 13 | Red'nt inbound read 1:13 | Redundant inbound read 1 |
| T19 | Inbound Read 1 | Inbound Read 1 | Inbound Read 1 |
| T20:24 | Cmd 1:5 (Copy B) | Inbound Read 2:6 | Cmd 1:5 (Copy B) |
| T25:29 | Cmd 1:5 (Copy C) | Inbound Read 7:11 | Cmd 1:5 (Copy C) |
| T30 | Redundant link B/inbound read 1 | Inbound Read 12 | Redundant link B |
| T31 | Redundant link C | Inbound Read 13 | Redundant link C |

FIG. 8 represents a third variation of a sub-cluster configuration 501. In the configuration of FIG. 8, all lines (i.e., command/address as well as stored data) operate at the same clock frequency, specifically at the ⅓ clock frequency of 2 GT/s. In order to transmit all the command/address data using lower frequency lines, the configuration of FIG. 8 uses a larger number of command/address lines for each link. This larger number of lines can be supported by relaxing the default restriction that all bus links are point-to-point, i.e., by using multi-drop lines. In this case, outgoing command/address data is transmitted on a multi-drop link to two memory chips simultaneously. Preferably, the individual memory chips are physically arranged in close proximity with one another and with hub 402. This fact, together with the use of a lowered bus clock frequency, should generally make it possible to reliably support a multi-drop configuration without modification of the chip I/O driver/receiver hardware, notwithstanding that memory chips 202 are intended for use with point-to-point communication links.

Referring to FIG. 8, an outbound link 801 runs from hub 402 to memory chips 202A and 202B. Outbound link 801 comprises 13 point-to-point data lines for transmitting write data, of which 6 run to memory chip 202A and 7 run to memory chip 202B. Outbound link 801 further comprises 15 command/address lines for transmitting command/address data, which are multi-drop and run to both chips 202A and 202B. In the alternative, in the event that outbound link 801 is too long or for other reasons unable to support multi-drop, the 15 command/address lines could be duplicated, one set running to memory chip 202A and the other set to memory chip 202B, so that two separate point-to-point links run to chips 202A and 202B from hub 402. All lines of link 801 operate at a bus frequency of 2 GT/s, i.e. at ⅓ bus frequency. Since command address data is transmitted on 15 lines, the same amount of data can be transmitted at the lower frequency.

Memory chips 202A and 202B in turn drive respective outbound multidrop links 802, 803 to memory chips 202C and 202D (for link 802), and 202E and 202F (for link 803). Outbound link 802 from memory chip 202A comprises 5 data lines and 15 command/address lines. Outbound link 803 from memory chip 202B comprises 6 data lines and 15 command/address lines. All lines on links 802, 803 operate at a bus frequency of 2 GT/s.

Each of memory chips 202C, 202D, 202E and 202F in turn drives a respective outbound link to a respective pair of memory chips (or in the case of chip 202D, to single memory chip 202I). For example, memory chip 202C drives outbound link 804 to chips 202G, 202H, link 804 comprising 15 multi-drop command/address lines (which go to both chips) and 2 write data lines, one to each of chips 202G and 202H. All these lines operate at a bus frequency of 2 GT/s.

Each of memory chips 202A–202M drives a single respective inbound read data line directly to hub 402, also at a bus frequency of 2 GT/s.

In operation, hub 402 accumulates the first three bus cycles of a command/address (a total of 15 bits of command/address data), which preferably contains sufficient information to determine whether the command is addressed to the subject cluster. If so, the command is simultaneously re-transmitted to each of the three sub-clusters of the cluster to which the command is addressed on the 15 command/address lines of link 801 for the sub-cluster at 2 GT/s. Since these 15 command/address lines are multi-drop, the command/address data is received in both chip 202A and chip 202B. If the command is a write command, the hub will also receive write data on its 13 outbound data input lines from the memory controller. This write data is re-transmitted in an interleaved fashion to the three sub-clusters, each sub-cluster receiving write data at 2 GT/s on the 13-line data portion of link 801.

Memory chips 202A and 202B then re-transmit the command/address data on 15-line command/address portions of links 802 and 803, respectively, to chips 202C, 202D, 202E and 202F. If the command is a write command, chip 202A re-transmits the 5 bits of write data for memory chips 202C, 202D, 202G, 202H and 202I on link 802 as well, while chip 202B similarly re-transmits the 6 bits of write data for memory chips 202E, 202F, and 202J-202M on link 803. Each of memory chips 202C, 202D, 202E and 202F then re-transmits the command/address and applicable write data to the corresponding pair of chips (or single chip). I.e., Chip 202C re-transmits data to chips 202G and 202H, and so on, as shown in FIG. 8.

If the command is a read command, each chip transmits the corresponding read data from the chip on its respective 1-bit line directly to hub 402 at 2 GT/s. This data is stored in interleaved fashion, as in the configurations of FIGS. 6 and 7. The read data is buffered as necessary by hub 402, and later re-transmitted to the memory controller on chain 404.

Table 3 shows a representative set of pin assignments for the configuration of FIG. 8, compared with that of the base (daisy-chained) mode. All chips 202A-202M can use the same mode configuration of pin assignments, although some of the chips do not use all the pins listed in FIG. 8. E.g., chip 202G does not re-transmit command/address data or receive write data for another chip, so pins R7:18, T1:5, T7:18 and T20:29 are unused. It will be observed that the pin assignment in the configuration of FIG. 8 is virtually identical to the base pin assignment of the daisy-chained mode, and cmd 6:15 are received and forwarded on the unused inbound read lines 2:11. Of course, it is necessary for internal chip logic to recognize switching signals on lines R20:29 as command/address data (rather than inbound read data) for purposes of decoding the command and address.

TABLE 3

Pin Assignments for Base and Third Alternate mode (FIG. 8)

|  | Base Operating Mode | Alt Mode (FIG. 8) |
|---|---|---|
| R1:R5 | Cmd 1:5 | Cmd 1:5 |
| R6 | Outbound Wrt Data 1 | Outbound Wrt Data 1 (chip) |
| R7:R18 | Outbound Wrt Data 2:13 | Outbound Wrt Data 2:13 |
| R19:R31 | Inbound Read Data 1 | Not Used |
| R20:29 | Inbound Read Data 2:11 | Cmd 6:15 |
| R30:31 | Inbound Read Data 12:13 | Not Used |
| T1:5 | Cmd 1:5 | Cmd 1:5 |
| T6 | Outbound Wrt Data 1 | Not Used |
| T7:T18 | Outbound Wrt Data 2:13 | Outbound Wrt Data 2:13 |
| T19 | Inbound Read Data 1 | Inbound Read Data 1 (Chip) |
| T20:29 | Inbound Read Data 2:11 | Cmd 6:15 |
| T30:31 | Inbound Read Data 12:13 | Not Used |

As explained previously, in each of the alternative configurations of the preferred embodiment, up to 78 bits of addressable data and auxiliary bits in each memory access is interleaved among three sub-clusters, each containing 13 chips, so that each chip contains 2 bits of each memory access. In a standard daisy-chained configuration, all the data of a memory access (8 bytes plus any auxiliary bits) is on a single chip. For identical sized chips, it takes 5 more bits of address to specify 2 bits (as in the preferred embodiment) than it does to specify 8 bytes (as in the base operating mode). It may appear that this would require additional address lines. However, the base operating mode also uses some address bits to specify which chip in a daisy-chain is addressed. These chip select address bits are not needed for accessing chips in a cluster according to the preferred embodiment, because the hub decodes the full address received from the memory controller, and will forward a command to a particular cluster only if the command is intended for that cluster. It is assumed herein that the chip select address bits, which are not needed for specifying a chip in a cluster configuration, are sufficient to provide additional address data necessary to specify 2 bits of interleaved data within a chip (as opposed to 8 bytes within a chip).

Although the configurations of the preferred embodiment support up to 14 auxiliary bits, it is not necessary to use all, or indeed any, of the auxiliary bit positions. If it is desired to save costs of additional chips, it would alternatively be possible to leave some or all of the auxiliary bit positions unpopulated with corresponding chips.

While various uses can be made for the up to 14 auxiliary bits disclosed herein as a preferred embodiment, one particular application is the support of redundant memory chips, also known as chip kill. Redundancy is supported by designating one or more of the 39 chips in each cluster as a redundant spare chip. In the event that a chip malfunction is detected in any chip of the cluster, the data assigned to the malfunctioning chip can be thereafter assigned to the spare chip. If necessary, data previously written to the malfunctioning chip can be reconstructed using ECCs and re-written to the spare chip. Such a remapping of chip storage capability could be performed in memory controller 401 or in hub 402.

One possible memory architecture variation that is supportable by a hierarchical interleaved design as described herein is a significantly higher volume of data transferred by each command on the memory controller-hub bus links 405 and on the hub-chip bus links 502. In the various embodiments described above, each read or write command transfers 8 bytes of read or write data, plus auxiliary bits (up to 78 total bits), and requires 6 bus cycles on memory controller-hub bus links 405. This number of cycles for each data access is sometimes referred to as a burst rate, and burst rates of 4 or 8 for a conventional daisy-chained configuration would be typical. The burst rate in a daisy-chained configuration is typically limited by error-correcting codes (ECC), the desirability of supporting chip kill, and other factors. However, a hierarchical interleaved design as described herein has inherent redundancy which would enable a higher burst rate. In fact, the amount of data transferred in a single data access could be as high as the cache line size, e.g. 64 or 128 bytes.

Transferring a greater volume of data in each data access eliminates the need to keep repeating the command, and therefore reduces the volume of command/address data transmitted. This reduction would make it possible to reduce the number of lines for command/address data and/or reduce the frequency of these lines. In such a case, it may be preferable to use shared lines for command/address and write data, rather than dedicated lines as described above.

For example, if 64 bytes of read or write data are to be transferred with each data access, then the 13 data lines on bus links 405 as described above will require 48 cycles to transfer the data. But since only 30 bits of command/address need to be transmitted, a single command/address line would be sufficient, since it would have 48 cycles in which to transfer the 30 bits. (In fact, the number of bits could be reduced because three fewer address lines are required to specify a 64 byte cache line, assuming it is aligned on a 64-byte boundary.) In this case, however, it is probably undesirable to use a single dedicated line for command/address, because the receiving device must wait a large number of cycles before it knows the address of the accessed data. It is preferable to share all the lines, so that the command/address data is transferred first using all lines, followed by the write data (if applicable). The fact remains that the total number of lines required could be reduced, because the total volume of bus data required to be transferred for an equivalent amount data accessed is reduced.

The example can further by applied to the hub-chip bus links 502. If, for example, the configuration of FIG. 6 is used in a memory architecture transferring 64 bytes of data per access, then link 601 preferably contains multiple lines which are shared for command/address and data, all of which can operate at 2 GT/s, i.e. ⅓ the clock frequency of the memory bus-hub links 405. Command/address is transferred first, followed by data. Since 48 cycles on the memory bus-hub links 405 are needed for each data access operation, link 601 operating at ⅓ frequency will complete 16 cycles, and must transfer approximately 30 bits of command/address and 208 bits of data and auxiliary bits. Only 15 lines are required on link 601.

Similarly each of links 602, 603 and 604 must transfer the same approximately 30 bits of command/address and 64 bits of data and auxiliary bits. Since 16 cycles are available, a minimum of 6 lines is needed for each of links 602, 603, 604. However, it may be desirable to use a larger number (e.g. 9 or 10 lines), because by using 6 lines it will take 5 cycles to transfer all the command/address, which would increase latency. The number of lines should be limited to 10 to stay within the total number of 31 available output ports on each chip. A similar analysis would be applied links 605, 606, 607.

Of course, in such a configuration the internal logic of the chips may be further complicated by the need to support the different line usages, buffer command/address information, and so forth. When compared with the various configurations described earlier herein, the provision of a larger volume of data per memory access command as described above may increase latency if more cycles (or slower cycles) are required to transmit command/address data, but could reduce the number of lines required, enabling memory controllers and/or hubs to more easily support larger memory configurations, and could also reduce power consumption by lowering bus frequency of some lines.

In the various alternatives described above with respect to FIGS. 6-8, outbound command/address and write data is propagated down multiple levels of a tree of memory chips. E.g., in the configuration of FIG. 6, outbound command/address and write data is first transmitted from the hub to chip 202A (at a first level), then to chips 202B, 202C and 202D (at a second level), then to the remaining chips at a third level. Each succeeding level introduces additional latency in propagating the memory access command. It would be possible to configure the chips of a cluster in a different number of levels. For example, instead of dividing the cluster into three sub-clusters and driving separate command/address data simultaneously to all three sub-clusters, it would be possible to provide all data to a single chip and re-propagate it to succeeding levels of a single cluster. This approach may reduce the number of lines needed in the hub, but at a cost of increasing the latency and power consumption.

In the various configurations described above with respect to FIGS. 6-8, it is assumed that write data is propagated successively down the tree in the same manner as command/address data. However, since each bit of write data has only a single destination, it may alternatively be possible to provide direct links between the memory modules and hub for write data, and to propagate only the command/address down the tree. This variation may increase the complexity of internal logic and buffering in either the hub or memory chips or both. It would not necessarily reduce the number of output lines in the hub, but would reduce the number of I/O lines needed in the chips to re-propagate write data down the tree, thus reducing power consumption and possibly providing additional configuration flexibility. It will be observed, however, that such a variation may be impractical where write data and command/address data are transmitted on the same shared lines.

Although FIGS. 6-8 show specific configurations embodying the general principles of the present invention, it will be appreciated that numerous alternative configurations of memory chips could be used in accordance with the present invention. By way of example and not by way of limitation, in addition to any of the variations disclosed elsewhere herein, any of the following parameters might vary within the scope of the present invention: a cluster may or may not contain sub-clusters, and the number of sub-clusters may vary; the number of chips in a cluster or sub-cluster may vary; the number of command/address or data lines may vary; the bus frequency and/or number of bus cycles per memory access may vary; the number of data bits and/or command/address bits per memory access may vary; the number of levels in a tree of chips which propagates signals to the cluster may vary; the granularity of the data interleave may vary; the number and function of ports in the memory chips may vary; etc.

In the preferred embodiments described herein, multiple hub re-drive chips connected in a daisy chain are used to access multiple clusters of memory chips. This configuration is employed to support a large number of memory chips on each memory controller bus port. However, it would alternatively be possible to connect memory chip clusters or sub-clusters directly to the memory controller, without the use of hub re-drive chips. Such an alternative generally would support a smaller number of memory chips than the configurations of the preferred embodiment.

In the preferred embodiment described herein, multiple-mode memory chips are used in which, in at least one operating mode, the chips can function in a conventional daisy-chained configuration, and in at least one other operating mode, the chips can function in a hierarchical memory configuration as described herein. However, it would alternatively be possible to use single-mode memory chips designed specifically for such a hierarchical configuration, or to use memory chips which do not support the daisy-chained configuration as described.

Although a specific embodiment of the invention has been disclosed along with certain alternatives, it will be recognized by those skilled in the art that additional variations in form and detail may be made within the scope of the following claims:

What is claimed is:

1. A memory apparatus for a computer system, comprising:
a plurality of memory modules arranged in a tree having a plurality of hierarchical levels including a first level and a second level, each memory module of said plurality of memory modules storing data at addressable storage locations therein and belonging to a respective level of a plurality of hierarchical levels, said first level having at least one said memory module, second level having a larger number of said memory modules than said first level;
at least one access module controlling access to said plurality of memory modules;
a first communications medium coupling each memory module of said first level to a respective access module of said at least one access module;
a second communications medium coupling each memory module of said second level to a respective memory module of said first level;
wherein memory access communications of a first type passing between said at least one access module and said at least one memory module of said first level are transmitted directly between said access module and said at least one memory module of said first level using said first communications medium, and wherein memory access communications of said first type passing between said at least one access module and said memory modules of said second level are transmitted between said access module and said memory modules of said second level via said at least one memory module of said first level using said first communications medium and said second communications medium; and
wherein each said memory access communication of a first type issued by said at least one access module accesses a respective set of data locations in a respective subset of said memory modules, each said subset of said memory modules containing a plurality of said memory modules including a respective at least one memory module of said first level and at least one memory module of said second level coupled to the respective at least one memory module of said first level by said second communications medium, each said respective set of data locations including at least one respective data location in each memory module of the respective subset of memory modules.

2. The memory apparatus of claim 1, wherein said first level of said memory apparatus comprises a plurality of said memory modules, each said memory module of said first level being a root of a respective tree of memory modules which includes a respective subset of a plurality of disjoint subsets of said memory modules of said second level.

3. The memory apparatus of claim 2, wherein said memory apparatus comprises a plurality of said access modules, each said access module being coupled by said first communications medium to a respective subset of a plurality of disjoint subsets of said plurality of memory modules of said first level.

4. The memory apparatus of claim 1,
wherein said first communications medium comprises a respective point-to-point communications link connecting each said memory module of said first level to a respective access module of said at least one access module; and
wherein said second communications medium comprises a respective point-to-point communications link connecting each said memory module of said second level to a respective said memory module of said first level.

5. The memory apparatus of claim 1,
wherein each said subset of said memory modules contains a respective plurality of memory modules of said first level and all memory modules of said second level coupled to any one of the respective plurality of memory modules of said first level by said second communications medium.

6. The memory apparatus of claim 1,
wherein said plurality of hierarchical levels includes a third level, said third level having a larger number of said memory modules than said second level;
wherein said memory apparatus further comprises a third communications medium coupling each memory module of said third level to a respective memory module of said second level; and
wherein memory access communications of said first type passing between said at least one access module and said memory modules of said third level are transmitted between said at least one access module and said memory modules of said third level via said memory modules of said first level and said memory modules of said second level using said first communications medium, said second communications medium and said third communications medium.

7. The memory apparatus of claim 1, wherein each said memory module comprises control logic which supports a plurality of modes of operation, including a first mode of operation supporting memory modules arranged in a daisy-chained configuration, and a second mode of operation supporting memory modules arranged in said plurality of hierarchical levels.

8. A memory apparatus for a computer system, comprising:
a plurality of memory modules arranged in a tree having a plurality of hierarchical levels including a first level and a second level, each memory module of said plurality of memory modules storing data at addressable storage locations therein and belonging to a respective level of a plurality of hierarchical levels, said first level having at least one said memory module, second level having a larger number of said memory modules than said first level;
at least one access module controlling access to said plurality of memory modules;
a first communications medium coupling each memory module of said first level to a respective access module of said at least one access module;
a second communications medium coupling each memory module of said second level to a respective memory module of said first level;
wherein memory access communications of a first type passing between said at least one access module and said at least one memory module of said first level are transmitted directly between said access module and said at least one memory module of said first level using said first communications medium, and wherein memory access communications of said first type passing between said at least one access module and said memory modules of said second level are transmitted between said access module and said memory modules of said second level via said at least one memory module of said first level using said first communications medium and said second communications medium; and
a third communications medium coupling each memory module of said second level directly to a respective access module of said at least one access module, wherein memory access communications of a second type passing between said at least one access module and said memory modules of said second level are transmitted directly between said at least one access module and said memory modules of said second level using said third communications medium.

9. The memory apparatus of claim 8,
wherein said memory access communications of said first type comprise data access commands being transmitted from said at least one access module to said memory modules; and
wherein said memory access communications of said second type comprise read data being transmitted from said memory modules to said at least one access module responsive to data access commands issued by said at least one access module.

10. The memory apparatus of claim 9,
wherein said memory access communications of said first type further comprise write data being transmitted from said at least one access module to said memory modules, said write data being data to be written to said memory modules responsive to data access commands issued by said at least one access module.

11. The memory apparatus of claim 8,
wherein said first communications medium comprises a respective point-to-point communications link connecting each said memory module of said first level to a respective access module of said at least one access module;
wherein said second communications medium comprises a respective point-to-point communications link connecting each said memory module of said second level to a respective said memory module of said first level; and
wherein said third communications medium comprises a respective point-to-point communications link connecting each said memory module of said second level to a respective access module of said at least one access module.

12. A computer system, comprising:
at least one processor;
a memory for storing data in addressable storage locations accessed by said at least one processor, said memory comprising:
(a) a plurality of memory modules arranged in a tree having a plurality of hierarchical levels including a first level and a second level, each memory module of said plurality of memory modules storing data at addressable storage locations therein and belonging to a respective level of a plurality of hierarchical levels, said first level having at least one said memory module, second level having a larger number of said memory modules than said first level;

(b) at least one access module controlling access to said plurality of memory modules;

(c) a first communications medium coupling each memory module of said first level to a respective access module of said at least one access module, said first communications medium comprising a respective at least one point-to-point communications link corresponding to each memory module of said first level, each said point-to-point communications link coupling the corresponding memory module of said first level to the respective access module of said at least one access module; and (d) a second communications medium coupling each memory module of said second level to a respective memory module of said first level, said second communications medium comprising a respective at least one point-to-point communications link corresponding to each memory module of said second level, each said point-to-point communications link coupling the corresponding memory module of said second level to the respective memory module of said first level;

wherein memory access communications of a first type passing between said at least one access module and said at least one memory module of said first level are transmitted directly between said access module and said at least one memory module of said first level using a respective said point-to-point communications link of said first communications medium corresponding to each said at least one memory module of said first level, and wherein memory access communications of said first type passing between said at least one access module and said memory modules of said second level are transmitted between said access module and said memory modules of said second level via said at least one memory module of said first level using a respective said point-to-point communications link of said first communications medium corresponding to each said at least one memory module of said first level and a respective said point-to-point communications link of said second communications medium corresponding to each said at least one memory module of said second level.

13. The computer system of claim 12, wherein said computer system comprises a plurality of said processors, said processors sharing access to said memory.

14. The computer system of claim 12, wherein said first level of said memory comprises a plurality of said memory modules, each said memory module of said first level being a root of a respective tree of memory modules which includes a respective subset of a plurality of disjoint subsets of said memory modules of said second level.

15. The computer system of claim 14, wherein said memory comprises a plurality of said access modules, each said access module being coupled by said first communications medium to a respective subset of a plurality of disjoint subsets of said plurality of memory modules of said first level.

16. The computer system of claim 12, wherein each memory access command issued by said at least one access module accesses data locations in a respective subset of said memory modules, each said subset containing a plurality of said memory modules including a respective at least one memory module of said first level and all memory modules of said second level coupled to the respective at least one memory module of said first level by said second communications medium.

17. The computer system of claim 12, further comprising a third communications medium coupling each memory module of said second level directly to a respective access module of said at least one access module, wherein memory access communications of a second type passing between said at least one access module and said memory modules of said second level are transmitted directly between said at least one access module and said memory modules of said second level using said third communications medium.

18. The computer system of claim 17, wherein said memory access communications of said first type comprise data access commands being transmitted from said at least one access module to said memory modules; and wherein said memory access communications of said second type comprise read data being transmitted from said memory modules to said at least one access module responsive to data access commands issued by said at least one access module.

* * * * *